(12) United States Patent
Shin et al.

(10) Patent No.: US 11,526,363 B2
(45) Date of Patent: Dec. 13, 2022

(54) ELECTRONIC APPARATUS AND CONTROL METHOD THEREOF

(71) Applicant: SAMSUNG ELECTRONICS CO., LTD., Suwon-si (KR)

(72) Inventors: Hyungjong Shin, Suwon-si (KR); Changsu Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 47 days.

(21) Appl. No.: 16/916,583

(22) Filed: Jun. 30, 2020

(65) Prior Publication Data

US 2021/0004239 A1  Jan. 7, 2021

(30) Foreign Application Priority Data

Jul. 4, 2019  (KR) .......................... 10-2019-0080497

(51) Int. Cl.
*G06F 9/44* (2018.01)
*G06F 9/4401* (2018.01)

(52) U.S. Cl.
CPC ............ *G06F 9/441* (2013.01); *G06F 9/4403* (2013.01)

(58) Field of Classification Search
CPC ............................... G06F 9/441; G06F 9/4403
See application file for complete search history.

(56) References Cited

U.S. PATENT DOCUMENTS

| 2006/0053270 | A1* | 3/2006 | Dunn | ...................... G06F 9/441 712/13 |
|---|---|---|---|---|
| 2006/0129520 | A1 | 6/2006 | Lang | |
| 2006/0195836 | A1 | 8/2006 | Lu et al. | |
| 2007/0061372 | A1 | 3/2007 | Appavoo et al. | |
| 2010/0180281 | A1 | 7/2010 | Chandra et al. | |
| 2014/0130064 | A1 | 5/2014 | Haemel et al. | |
| 2015/0319222 | A1 | 11/2015 | Zamir | |
| 2016/0092202 | A1 | 3/2016 | Filali-Adib et al. | |
| 2019/0034186 | A1 | 1/2019 | Franchi et al. | |
| 2019/0079746 | A1 | 3/2019 | Thomas et al. | |

FOREIGN PATENT DOCUMENTS

| KR | 10-2008-0023841 | 3/2008 |
|---|---|---|
| KR | 10-0850994 | 8/2008 |
| KR | 10-1123685 | 3/2012 |

OTHER PUBLICATIONS

International Search Report and Written Opinion dated Oct. 21, 2020 in corresponding International Application No. PCT/KR2020/008721.

Extended European Search Report dated Apr. 12, 2022 for EP Application No. 20834996.9.

* cited by examiner

*Primary Examiner* — Stefan Stoynov
(74) *Attorney, Agent, or Firm* — Nixon & Vanderhye P.C.

(57) ABSTRACT

An electronic apparatus includes: a memory; a storage configured to store a first operating system; and a processor configured to: perform booting by loading the first operating system stored in the storage to the memory, and store data, obtained based on the first operating system running, in the storage, load an obtained second operating system and the data stored in the storage to the memory, identify operation compatibility between the second operating system and the data loaded to the memory, perform booting by loading the second operating system to the memory, based on identification of normal operation compatibility, and perform booting by loading the first operating system to the memory, based on identification of abnormal operation compatibility.

18 Claims, 16 Drawing Sheets

ELECTRONIC APPARATUS AND CONTROL METHOD THEREOF

CROSS-REFERENCE TO RELATED APPLICATION

This application is based on and claims priority under 35 U.S.C. § 119 to Korean Patent Application No. 10-2019-0080497 filed on Jul. 4, 2019 in the Korean Intellectual Property Office, the disclosure of which is incorporated by reference herein in its entirety.

BACKGROUND

Field

The disclosure relates to an electronic apparatus driven by an operating system and a control method thereof, and for example to an electronic apparatus, of which a preinstalled operating system is replaced with another operating system or upgraded with a different version of the operating system, and a control method thereof.

Description of Related Art

To compute and process predetermined information in accordance with certain processes, an electronic apparatus basically includes a central processing unit (CPU), a chipset, a memory, and the like electronic components for the computation. Such an electronic apparatus may be variously classified in accordance with what information will be processed and what it is used for. For example, the electronic apparatus is classified into an information processing apparatus such as a personal computer (PC), a server or the like for processing general information; an image processing apparatus for processing image data; an audio apparatus for audio process; home appliances for miscellaneous household chores; etc. The image processing apparatus may be embodied by a display apparatus that displays an image based on processed image data on its own display panel.

In terms of hardware, the electronic apparatus operates based on operation of a central processing unit (CPU), a controller, or a processor. Further, in terms of software, the electronic apparatus is implemented by an operating system or the like platform, or by middleware or an application executed on the platform. In other words, the electronic apparatus basically needs to be installed with a proper operating system in order to normally operate. The operating system may be called and executed based on a boot loader or boot script while the electronic apparatus is booted, and various applications or functions are implemented on the operating system.

Various means for upgrading the electronic apparatus in terms of the hardware or software are applied to add a new function or develop the existing functions. As one of various upgrading means, there is a method of upgrading, updating or replacing the operating system. The electronic apparatus may receive a new operating system from a connected external apparatus, or may receive a new operating system from a server through a network. The electronic apparatus is booted up with this new operating system at the next bootup.

However, the electronic apparatus does not only need the operating system to carry out the operation of the electronic apparatus. For example, the electronic apparatus cumulatively stores various kinds of reference data referred to for a period of time when the previous operating system is used. The operating system refers to this reference data, so that the electronic apparatus can implement operations and functions reflecting a user's preference or use environments. Thus, even after the operating system is upgraded in the electronic apparatus, it is preferable to continuously use the reference data referred to by the previous operating system in terms of maintaining continuity of use.

However, the upgrading or replacement of the software may often cause a problem of compatibility. The reference data referred to by the previous operating system has compatibility with the previous operating system, but is not guaranteed to have compatibility with a new operating system. When the electronic apparatus is booted for the first time after its operating system is replaced with a new operating system, the new operating system refers to the previous reference data. However, when the new operating system is incompatible with the previous reference data, the electronic apparatus is unable to operate. Further, even when the electronic apparatus is turned off or the like unexpected event occurs while the operating system is being upgraded, the operating system is not completely upgraded and thus the electronic apparatus is unable to operate.

Accordingly, the electronic apparatus may be required to cope with the problem of compatibility between a new operating system and the previous reference data or other various errors when the operating system is upgraded.

SUMMARY

According to an example embodiment of the disclosure, an electronic apparatus is provided, the electronic apparatus including: a memory; a storage configured to store a first operating system; and a processor configured to: perform booting by loading the first operating system stored in the storage to the memory, and store data, obtained based on the first operating system running, in the storage, load an obtained second operating system and the data stored in the storage to the memory, identify operation compatibility between the second operating system and the data loaded to the memory, perform booting by loading the second operating system to the memory based on the identification of normal operation compatibility, and perform booting by loading the first operating system to the memory based on the identification of abnormal operation compatibility.

The processor may be configured to convert the data stored in the storage to be adapted to a data form corresponding to the second operating system, and load the converted data to the memory.

The processor may be configured to store the converted data in the storage to replace the data stored in the storage, based on the identification of the normal operation compatibility.

The processor may be configured to isolate the converted data from a predetermined process running in the electronic apparatus, while the converted data is being generated in the memory and stored in the storage.

The processor may be configured to load data corresponding to the second operating system to the memory, and adjust values according to items of the data corresponding to the second operating system with values of the data stored in the storage.

The processor may be configured to store the second operating system in the storage based on obtaining the second operating system, and load the data stored in the storage to the memory by booting based on the second operating system.

The processor may be configured to load the data to the memory so that the data can be overlaid in a storage area, to which the second operating system is loaded, in the memory.

The processor may be configured to store the first operating system and the second operating system in respective partitions separated from each other in the storage.

The processor may be configured to store the data in a partition separated from the partitions in which the first operating system and the second operating system are stored, in the storage.

The processor may be configured to perform booting by loading the second operating system to the memory to use default data provided to the second operating system based on the identification of the abnormal operation compatibility.

According to another example embodiment of the disclosure, a method of controlling an electronic apparatus is provided, the method including: performing booting by loading a first operating system stored in a storage to the memory, and storing data, obtained based on the first operating system running, in the storage; loading an obtained second operating system and the data stored in the storage to the memory; identifying operation compatibility between the second operating system and the data which are loaded to the memory; performing booting by loading the second operating system to the memory based on the identification of normal operation compatibility; and performing booting by loading the first operating system to the memory based on the identification of abnormal operation compatibility.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Below, various example embodiments will be described in greater detail with reference to accompanying drawings. Further, the various example embodiments described with reference to the accompanying drawings are not exclusive to each other unless otherwise mentioned, and a plurality of embodiments may be selectively combined within one apparatus. The combination of these plural embodiments may be discretionally selected and applied.

In the disclosure, an ordinal number used in terms such as a first element, a second element, etc. is employed for describing variety of elements, and the terms are used for distinguishing between one element and another element. Therefore, the meanings of the elements are not limited by the terms, and the terms are also used simply for explaining the corresponding embodiment without limiting the disclosure.

Further, a term "at least one" among a plurality of elements in the disclosure represents not only all the elements but also each one of the elements, which excludes the other elements or all combinations of the elements.

Figure 1:
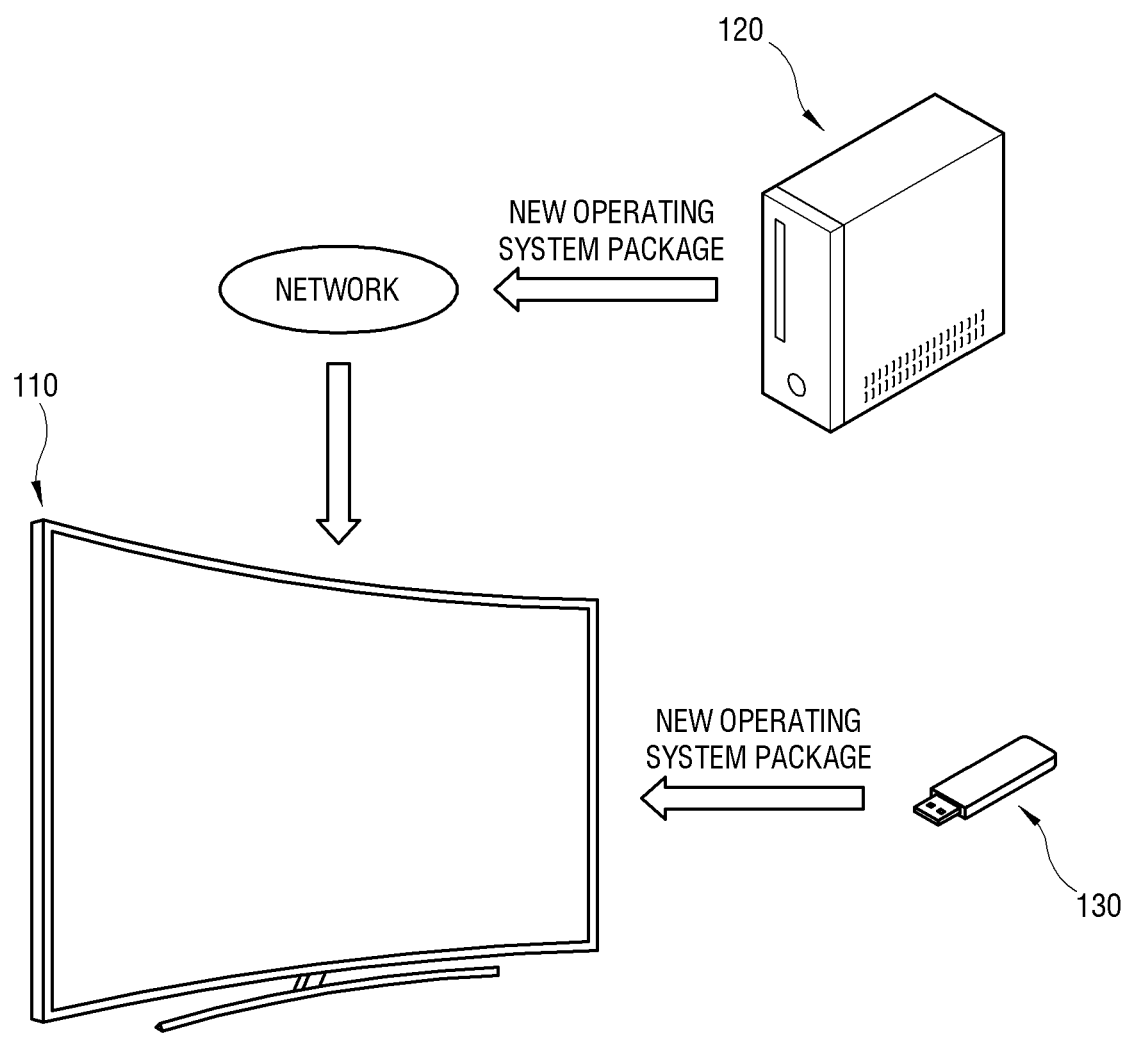
FIG. 1 is a diagram illustrating an example method by which an electronic apparatus obtains an operating system according to an embodiment.

FIG. 1 is a diagram illustrating an example method by which an electronic apparatus obtains an operating system according to an embodiment.

As shown in FIG. 1, the electronic apparatus 110 according to an example embodiment is realized by a television (TV) or the like display apparatus. However, the display apparatus is merely an example of the electronic apparatus 110, and the electronic apparatus 110 may be embodied by any apparatus that basically operates based on an operating system. For example, the electronic apparatus 110 may be a display apparatus such as a monitor, a tablet computer, a portable multimedia device, an electronic frame, a television, etc.; an image processing apparatus with no display panel such as a set-top box, a Blu-ray player, etc.; household appliances such as a washing machine, a refrigerator, a clothes manager, an air conditioner, etc. Further, the electronic apparatus 110 may be a stationary apparatus used as fixed to one place, or a mobile apparatus such as a smartphone, a wearable device, etc.

The electronic apparatus 110 operates based on association between hardware and software. For example, the electronic apparatus 110 operates as a processor performs operation based on execution of a platform code. The platform code used in the electronic apparatus 110 may for example include an operating system, e.g., a kernel.

The operating system of the electronic apparatus 110 may be upgraded according to various needs such as optimization, addition of a new function, development in the existing function, response to new standards, etc. An upgrading or updating method may include a method of entirely replacing a previously installed, old operating system with a new operating system, and a method of replacing some data codes among the whole data codes of the old operating system. Both two methods are all based on the concept of the disclosure.

The electronic apparatus 110 may obtain the new operating system for the upgrading through various paths. For example, the electronic apparatus 110 may obtain package data of the new operating system from a memory apparatus 130 connected to an external port. The electronic apparatus 110 may obtain the package data of the new operating system from a server 120 through a network.

The package data of the operating system may refer, for example, to data that is encoded, compressed or packaged from the data codes of the operating system into a preset format processible by the processor of the electronic apparatus, and may also be referred to as a data image of the operating system. This format may be based on various data compression techniques. Typically, the package data of the operating system is stored in a nonvolatile storage medium of the electronic apparatus 110.

The operating system is executed in a state that it is decoded or unpackaged from the package data. When the electronic apparatus 110 is booted up, a data code needed for the execution is extracted from the package data of the operating system stored in a nonvolatile storage medium (in other words, a necessary data code is extracted after the package data is unpackaged), and then loaded to a volatile memory. Such a process of loading the data code of the operating system, which is needed for executing the operating system, to the volatile memory may refer, for example, to the operating system being mounted. The operating system ready for use may also be regarded as a mounted operating system. As the processor executes the data code of the mounted operating system, the operating system of the electronic apparatus is executed and the electronic apparatus operates.

The operating system may refer, for example, to various kinds of reference data while running. The reference data is merely a term given for convenience of description to indicate data just referred to or used by the operating system, and the term itself does not limit attributes of data. The reference data may for example include setting information about settings for various functions of the electronic apparatus 110, account information about a user's account, apparatus history information about a user's use history of the electronic apparatus 110, content history information about a use's use history of viewed content or executed applications, etc. As such, the reference data may include use information about the electronic apparatus 110 optimized for a user, which reflects the user's pattern of using the electronic apparatus 110. The operating system refers to such reference data, thereby providing the operation or function of the electronic apparatus 110 optimized for a user.

The reference data may include, for example, change-allowed data that is changeable while the electronic apparatus 110 is used. The operating system is change-restricted data that is not changeable during general use except a special condition such as upgrading. In this regard, for convenience of description, the operating system may be referred to as read-only (RO) data, and the reference data may be referred to as read-write (RW) data.

The package data of the new operating system provided to the electronic apparatus 110 includes new RO data (e.g., a new operating system) and new RW data (e.g., new reference data). The new RO data and the new RW data are data which gives a guarantee of normal operation, e.g., compatibility when they are associated with each other, in a development stage. When the electronic apparatus 110 replaces old RO data (e.g., an old operating system) with new RO data, and uses new RW data instead of old RW data, a user' settings that have previously been applied to the electronic apparatus 110 are not reflected.

According to an embodiment, the electronic apparatus 110 allows new RO data to refer to old RW data after upgrading the operating system, thereby guaranteeing continuity of use. In this case, the electronic apparatus 110 carries out a process for guaranteeing compatibility between the new RO data and the old RW data, and the process will be described in greater detail below.

Below, the hardware of the electronic apparatus 110 will be described in greater detail.

Figure 2:
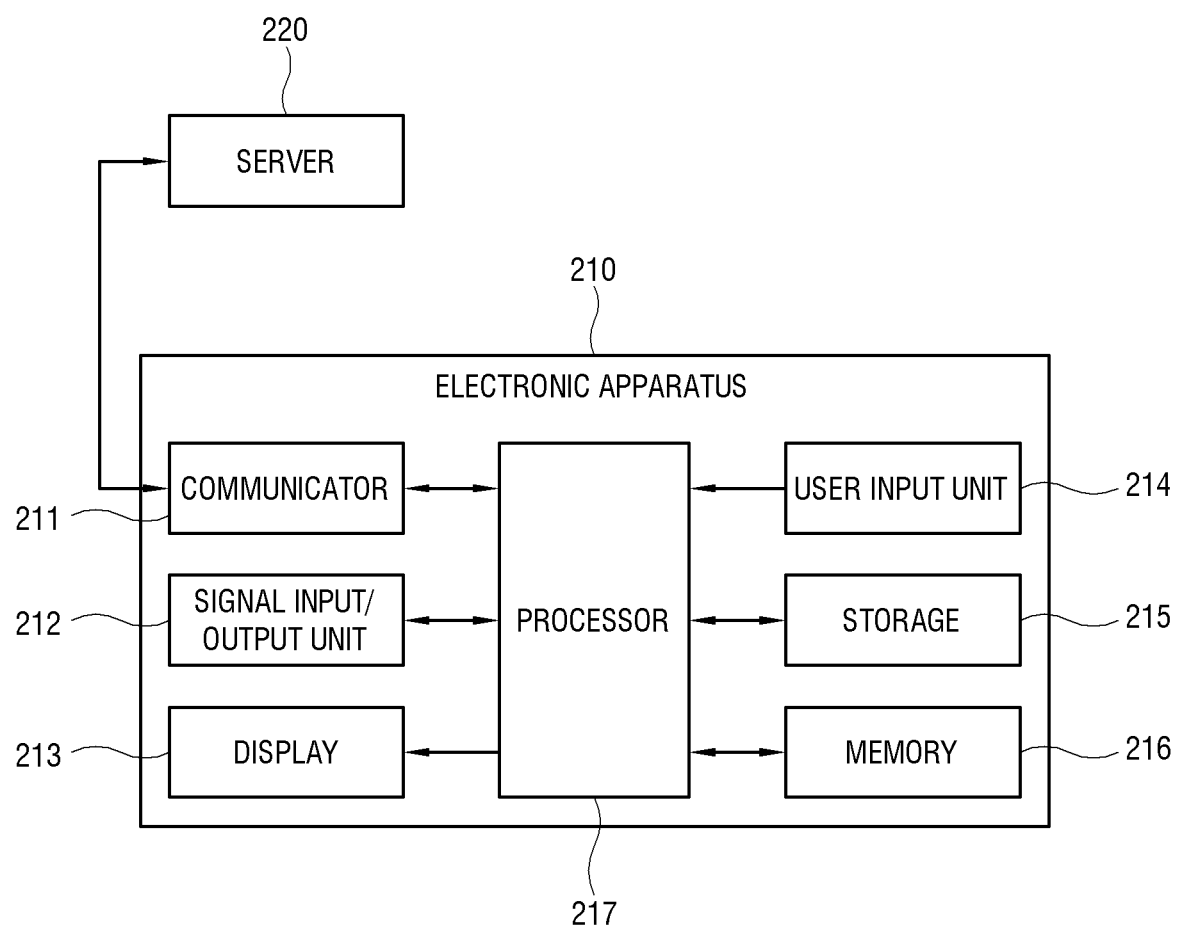
FIG. 2 is a block diagram illustrating an example electronic apparatus according to an embodiment.

FIG. 2 is a block diagram illustrating an example electronic apparatus according to an embodiment.

As shown in FIG. 2, an electronic apparatus 210 includes a communicator (e.g., including communication circuitry) 211, a signal input/output unit (e.g., including input/output circuitry) 212, a display 213, a user input unit (e.g., including user input circuitry) 214, a storage 215, a memory 216, and a processor (e.g., including processing circuitry) 217. In an example embodiment, it will be described that the electronic apparatus 210 is a display apparatus. However, the electronic apparatus 210 may be embodied by various kinds of electronic apparatuses, and therefore the hardware of the electronic apparatus 210 is not limited to an example embodiment.

The communicator 211 may refer, for example, to an interactive communication circuit that includes at least one of elements, such as a communication module, a communication chip, etc. corresponding to various wired and wireless communication protocols. For example, the communicator 211 may be embodied by a wireless communication module that performs wireless communication with an access point (AP) based on Wi-Fi, or a local area network (LAN) card connected to a router or a gateway by a wire. For example, the communicator 211 communicates with a server 220 on a network thereby transmitting and receiving a data packet to and from the server 220.

The signal input/output unit 212 may include, for example, various input/output circuitry and include may be one-to-one or one-to-many connected to an external apparatus such as a set-top box or an optical media player by a cable, thereby receiving or outputting data from and to the corresponding external apparatus. The signal input/output unit 212 may for example include various input/output circuitry, such as, for example, and without limitation, a high definition multimedia interface (HDMI) port, a display port, a universal serial bus (USB) port, and the like connectors or ports according to preset transmission standards.

The display 213 includes a display panel capable of displaying an image on a screen. The display panel is provided to have a light receiving structure such as a liquid crystal type, or a self-emissive structure such as an organic light emitting diode (OLED) type. The display 213 may include an additional element according to the structures of the display panel. For example, when the display panel is the liquid crystal type, the display 213 includes a liquid crystal display panel, a backlight unit configured to emit light, and a panel driving substrate configured to drive liquid crystal of the liquid crystal display panel.

The user input unit 214 includes may include various circuitry related to various input interfaces provided to be controlled by a user to make an input. The user input unit 214 may be variously configured according to the kinds of electronic apparatus 210, and may for example include a mechanical or electronic button of the electronic apparatus 210, a remote controller separated from the electronic apparatus 210, a touch pad, a touch screen installed in the display 213, etc.

The storage 215 is accessed by the processor 217, and performs operations such as reading, recording, deleting, etc. for data under control of the processor 217. The storage 215 may, for example, include a nonvolatile type that retains data regardless of whether power is turned on or off. The storage 215 includes a flash memory, a hard disk drive (HDD), a solid state drive (SSD), and the like. The storage 215 is configured to basically store the operating system for operating the electronic apparatus 210, and additionally store the reference data to be referred to by the corresponding operating system while the operating system is running.

The memory 216 may be loaded with data, which is to be executed by the processor 217, of the data stored in the storage 215. The memory 216 is a volatile type that retains data while power is turned on but cannot retain data while power is turned off. The memory 216 may include a random access memory (RAM), a buffer, etc.

When the electronic apparatus 210 performs a predetermined operation or function, data corresponding to the operation is first loaded from the storage 215 to the memory 216, and then the processor 217 processes the data loaded to the memory 216 in the future. For example, the data code of the operating system stored in the storage 215 stored in the storage 215 is loaded to the memory 216 by a boot loader when the electronic apparatus 210 is booted up, and the processor 217 executes the data code of the operating system loaded to the memory 216. Thus, the electronic apparatus 210 is driven by the operating system.

According to an embodiment, the storage 215 may include a nonvolatile recording medium, and the memory 216 may include a volatile recording medium.

The processor 217 may include various processing circuitry, including, for example, one or more hardware processors achieved, for example, by a central processing unit (CPU), a dedicated processor, a chipset, a buffer, a circuit, etc. which are mounted on a printed circuit board (PCB). The processor 217 may be designed as a system on chip (SoC). The processor 217 includes modules corresponding to various processes, such as a demultiplexer, a decoder, a scaler, an audio digital signal processor (DSP), an amplifier, etc. when the electronic apparatus 210 is embodied by a display apparatus. Among such modules, some or all of the modules may be achieved by the SoC. For example, a demultiplexer, a decoder, a scaler, and the like module related to an image process may be achieved as an image processing SoC, and an audio DSP may be achieved as a chipset separated from the SoC.

When a new operating system is received through the communicator 211 or the signal input/output unit 212 while a predetermined operating system and reference data referred to by the corresponding operating system are stored in the storage 215, the processor 217 may upgrade the previously stored operating system of the electronic apparatus 210 with the new operating system. The processor 217 in this case performs operation of identifying operation compatibility between the new operating system and the previously stored reference data, and such an embodiment will be described below.

Figure 3:
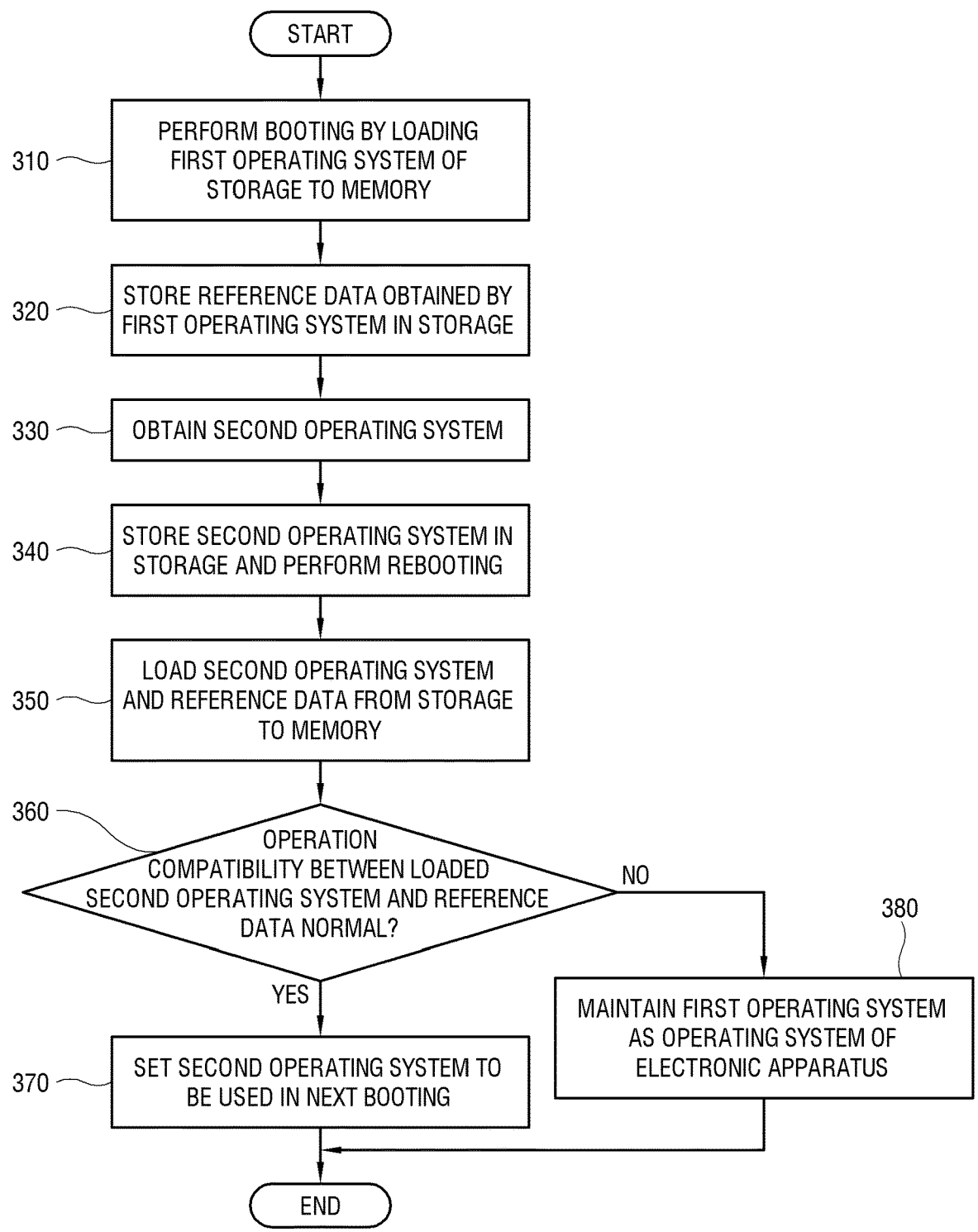
FIG. 3 is a flowchart illustrating example processes in a control method of an electronic apparatus according to an embodiment.

FIG. 3 is a flowchart illustrating example processes in a control method of an electronic apparatus according to an embodiment.

As shown in FIG. 3, the following operations performed by the electronic apparatus may be carried out the processor of the electronic apparatus.

At operation 310 the electronic apparatus is booted up by loading a first operating system stored in the storage to the memory in response to a booting instruction.

At operation 320 the electronic apparatus stores reference data, which is obtained or referred to by the first operating system while being driven by the first operating system, in the storage.

At operation 330 the electronic apparatus obtains a second operating system for upgrading the first operating system while being driven by the first operating system.

At operation 340 the electronic apparatus stores the obtained second operating system in the storage and is then rebooted.

At operation 350 the electronic apparatus loads the second operating system and the reference data stored in the storage to the memory. Here, the reference data may refer, for example, to reference data that has been obtained by the first operating system.

At operation 360 the electronic apparatus identifies whether the operation compatibility between the second operating system and the reference data loaded to the memory is normal.

When it is identified that the operation compatibility between the second operating system and the reference data loaded to the memory is normal ("Yes" at operation 360), at operation 370 the electronic apparatus sets the second operating system as the operating system to be used for booting in the future, and is rebooted. The electronic apparatus is rebooted with not the first operating system but the second operating system.

When it is identified that the operation compatibility between the second operating system and the reference data loaded to the memory is abnormal ("No" in operation 360), at operation 380 the electronic apparatus is not upgraded with the second operating system but maintains the first operating system as the operating system for the electronic apparatus.

When the electronic apparatus identifies that the operation is incompatible between the second operating system and the reference data while upgrading the operating system, the electronic apparatus performs a roll-back process to return the settings for the operation based on the first operating system. Further, the electronic apparatus may be powered off while upgrading the operating system. In this case, the first operating system is maintained in the storage as it is, and therefore the electronic apparatus uses the first operating system for the next booting, thereby performing the roll-back process of the operating system and guaranteeing the normal operation.

Thus, the electronic apparatus pre-checks the operation compatibility between the reference data referred to by the first operating system before the upgrading and the second operating system after the upgrading, and avoids a situation that the electronic apparatus does not work when the operation is incompatible between the reference data and the second operating system.

According to the related art, while the electronic apparatus is booted after being upgraded with the second operating system, the second operating system refers to the reference data, which has been referred to by the first operating system, for the first time. When the operation is compatible between the second operating system and the reference data, the electronic apparatus is normally booted up. On the other hand, when the operation is incompatible between the second operating system and the reference data, the electronic apparatus is not booted up and does not normally work. In this case, it is difficult for a general user to figure out a cause of problem, and it is also difficult to solve the problem.

On the other hand, when the second operating system is obtained, the electronic apparatus according to an example embodiment loads both the second operating system and the reference data to the memory while the first operating system is stored, and performs a process of checking the operation compatibility, thereby avoiding a situation that the electronic apparatus does not work due to a compatibility problem that may occur because of the upgraded operating system.

Below, an example process performed in the electronic apparatus when the operating system is changed from the first operating system to the second operating system will be described in greater detail.

Figure 4:
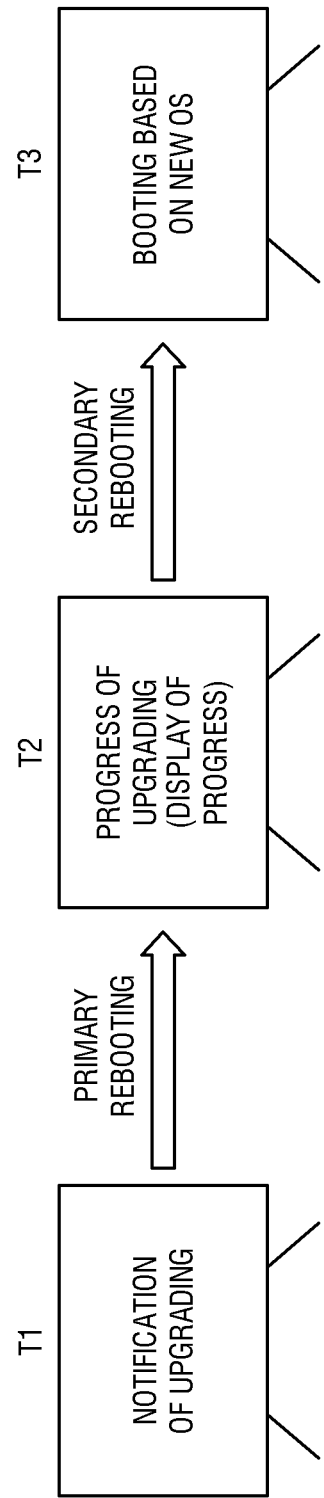
FIG. 4 is a diagram illustrating example processes performed according to time sections in an electronic apparatus according to an embodiment.

FIG. 4 is a diagram illustrating example processes performed according to time sections in an electronic apparatus according to an embodiment.

As shown in FIG. 4, when a process of upgrading the operating system is performed in the electronic apparatus, the whole time section may be divided, for example, into three time sections of T1, T2 and T3. In other words, transition from the time section T1 to the time section T2 is carried out as the electronic apparatus is primarily rebooted, and transition from the time section T2 to the time section T3 is carried out as the electronic apparatus is secondarily rebooted. The term 'reboot' is merely used for convenience of description.

In the time section T1, the electronic apparatus is booted with the previously stored first operating system and operates. The electronic apparatus stores the reference data obtained and referred to by the first operating system, e.g., corresponding to the first operating system in the storage. When the second operating system for the upgrading is obtained, the electronic apparatus stores the second operating system in an area of the storage separately from the first operating system.

The electronic apparatus displays a message that the operating system needs to be upgraded, thereby informing a user of a current state. When the electronic apparatus is previously set to be automatically upgraded, the electronic apparatus may not request approval for the upgrading to a user. The electronic apparatus may display a user interface (UI) for requesting the approval for the upgrading in addition to the message.

When the electronic apparatus is previously set or gets the approval for the upgrading in response to a user input, the electronic apparatus stores flag information directing operation needed for the upgrading at the next booting. Then, the electronic apparatus is primarily rebooted to upgrade the operating system.

At the primary rebooting, the upgrading process starts as the processor reads the flag information.

In the time section T2, the electronic apparatus is booted by loading the second operating system stored in the storage to the memory. Further, the electronic apparatus loads the reference data corresponding to the first operating system stored in the storage to the memory. In this case, the electronic apparatus may not load the reference data to the memory intact, but may load the reference data converted corresponding to the second operating system to the memory. The conversion of the reference data will be described in greater detail below.

To identify the operation compatibility between the second operating system and the reference data loaded to the memory, the electronic apparatus checks whether the reference data can be normally used by the second operating system. In detail, a checking method may employ various kinds of algorithms. As an example, the electronic apparatus executes data codes of the second operating system corresponding to the attributes of the reference data, thereby performing the check based on whether the corresponding reference data is normally processible.

When the check result shows normality, the electronic apparatus modifies the booting settings to be booted based on the second operating system in the future. Because the normal operations based on the second operating system are guaranteed, the electronic apparatus deletes the first operating system from the storage and is then secondarily rebooted. Based on progress of the process performed in the time section T2, the electronic apparatus may display a UI showing the progress.

In the time section T3, the electronic apparatus is booted based on the second operating system stored in the storage (e.g., secondary booting). Thus, the operating system is completely upgraded with the second operating system.

When the check result shows abnormality, the second operating system cannot continuously use the previously used reference data. Thus, the electronic apparatus is set to maintain booting based on the first operating system. The electronic apparatus may be designed to store new reference data provided along with the second operating system instead of the previously used reference data, and set the second operating system to use the stored new reference data. In this case, the normal operations of the electronic apparatus are guaranteed even though continuity of use is not guaranteed as the previously used reference data is deleted.

Below, the conversion process for the reference data will be described in greater detail.

Figure 5:
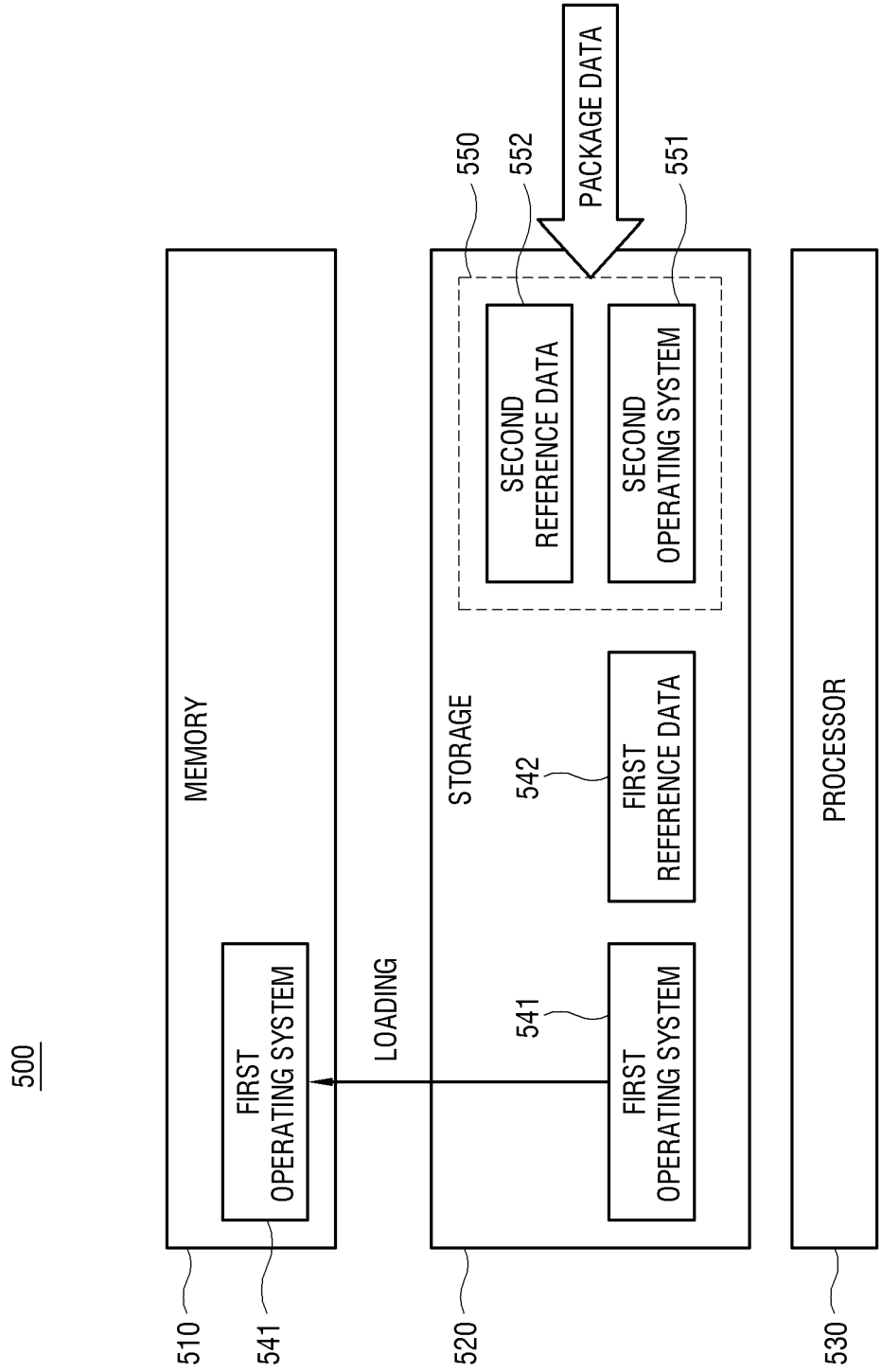
FIG. 5 is a block diagram illustrating an example method of storing package data of a second operating system when the package data is obtained by an electronic apparatus according to an embodiment.

FIG. 5 is a block diagram illustrating an example method of storing package data of a second operating system when the package data is obtained by an electronic apparatus according to an embodiment.

As shown in FIG. 5, an electronic apparatus 500 includes a memory 510, a storage 520, and a processor (e.g., including processing circuitry) 530. The storage 520 is configured to store a first operating system 541, and first reference data 542 to be referred to by the first operating system 541. The processor 530 may include various processing circuitry and loads and executes the first operating system 541 stored in the storage 520 to the memory 510, so that the electronic apparatus 500 can operate based on the first operating system 541. The first operating system 541 executes operations based on the first reference data 542 related to various events in response to the corresponding events.

When package data 550 for upgrading the operating system is received from the outside during the operation based on the first operating system 541, the processor 530 stores the received package data 550 in the storage 520. The package data 550 includes a second operating system 551, and second reference data 552 referred to by the second operating system 551. The second reference data 552 may include data that gives a guarantee of operation compatibility with the second operating system 551 so as to be normally referred to by the second operating system 551 when a developer develops and writes the package data 550. In other words, the second reference data 552 may include default data that is provided together to be used by the second operating system 551 and includes an initial value not changed by use yet.

The processor 530 stores the first operating system 541 and the second operating system 551 in separate partitions divided in the storage 520, respectively. Further, the processor 530 stores the first reference data 542 in another partition separated from the partitions in which the first operating system 541 and the second operating system 551 are respectively stored, within the storage 520.

The upgrading of the operating system includes a method of booting the electronic apparatus 500 with not the first operating system 541 but the second operating system 551. In other words, change in the settings for booting the electronic apparatus 500 is made from the first operating system 541 to the second operating system 551, thereby carrying out upgrading the operating system. However, to meet the foregoing continuity of use after upgrading the operating system, the second operating system 551 needs to be able to use the first reference data 542 that has been used by the previous first operating system 541.

The processor 530 stores the package data 550 in the storage 520, and stores the flag information directing the execution of upgrading the operating system so that the flag information can be referred to in the next booting. The processor 530 performs rebooting.

Figure 6:
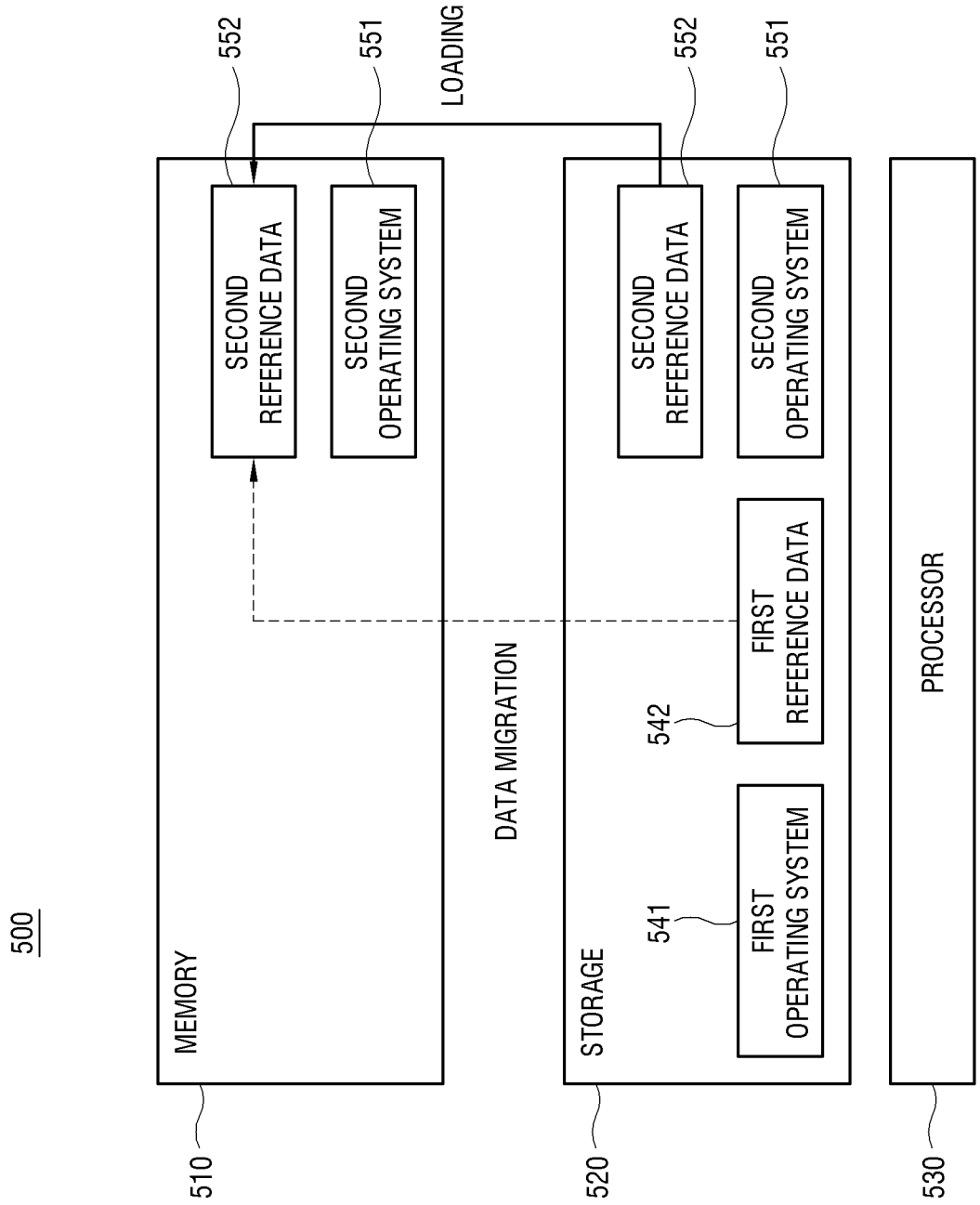
FIG. 6 is a block diagram illustrating an electronic apparatus performing example data migration for first reference data according to an embodiment.

FIG. 6 is a block diagram illustrating an example of an electronic apparatus performing data migration for first reference data.

As shown in FIG. 6, the processor 530 loads the second operating system 551 from the storage 520 to the memory 510 based on the foregoing flag information when the rebooting is carried out. Typically, the first operating system 541, the second operating system 551, the first reference data 542, and the second reference data 552 are stored in the storage 520 as they are inadequate to be directly processed by the processor 530 (for example, as encoded, compressed or in the like states). Thus, the first operating system 541, the second operating system 551, the first reference data 542, and the second reference data 552 are first loaded from the storage 520 to the memory 510 so as to be processed by the processor 530. For convenience of description, the operation of loading the memory 510 with the data to be processible is also referred to as the operation of mounting the data.

The processor 530 performs a process of converting the first reference data 542 to correspond to the second operating system 551. This process may be achieved by various methods. For example, the processor 530 may convert the first reference data 542 as follows.

The processor 530 loads the second reference data 552 first prepared for giving a guarantee of operation compatibility with the second operating system 551 from the storage 520 to the memory 510. The processor 530 performs data migration that moves the first reference data 542 stored in the storage 520 to correspond to the second reference data 552 loaded to the memory 510. The term 'data migration' is used for convenience to refer, for example, to the operation described in an example embodiment, and the term itself does not limit its meaning. In this case, the processor 530 loads the first reference data 542 from the storage 520 to the memory 510, and then performs the data migration of the first reference data 542 loaded to the memory 510.

Because the first reference data 542 is data compatible with the operation of the first operating system 541, it may be difficult for the second operating system 551 different from the first operating system 541 to recognize the first reference data 542. Thus, the processor 530 loads the second reference data 552 having a data form recognizable by the second operating system 551 to the memory 510, and updates the second reference data 552 loaded to the memory 510 with the first reference data 542 converted to have the data form of the second reference data 552. Such an operation may be referred to as the data migration, for convenience of description. As a result of the data migration, at least a part of the second reference data 552 loaded to the memory 510 is modified based on the first reference data 542, thereby generating third reference data (see '553' in FIG. 7). In other words, the third reference data includes content of the first reference data 542 converted to be adapted to the data form of the second reference data 552. An example of the data migration will be described later in more detail.

When the data migration is not normally carried out (e.g., when the operation compatibility is abnormal), the processor 530 may perform one of some operations as follows. For example, the processor 530 withdraws upgrading to the second operating system 551 and performs the roll-back to the first operating system 541. The processor 530 may allow the second operating system 551 to refer to not the third reference data 553 but the second reference data 552. Alternatively, the processor 530 may generate the third reference data 553 based on the value of the second reference data 552 instead of the data having an error during the data migration of the first reference data 542.

Figure 7:
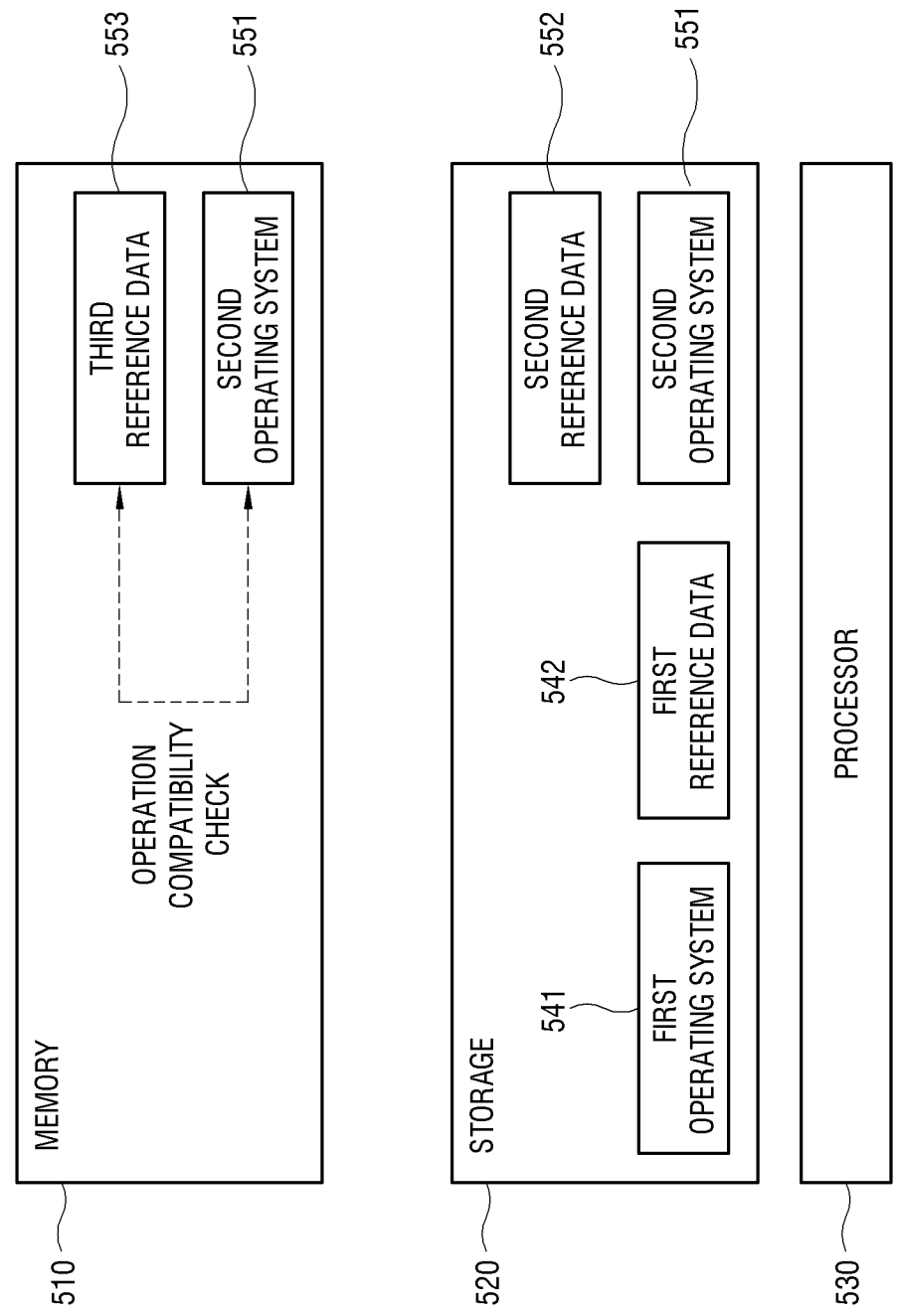
FIG. 7 is a block diagram illustrating an electronic apparatus checking operation compatibility between a second operating system and third reference data according to an embodiment.

FIG. 7 is a block diagram illustrating an example electronic apparatus checking operation compatibility between a second operating system and third reference data according to an embodiment.

As shown in FIG. 7, the third reference data 553 is generated in the memory 510 by the data migration of the first reference data 542. The processor 530 checks whether the operation compatibility between the second operating system 551 loaded to the memory 510 and the third reference data 553 is normal, e.g., whether the second operating system 551 is able to normally use the third reference data 553.

For example, the processor 530 may execute the second operating system 551 and simulate whether the second operating system 551 is able to normally refer to the third reference data 553.

When the check result shows that the operation compatibility is normal, the processor 530 makes change from the first operating system 541 to the second operating system 551 in the settings for the operating system used in booting. Further, the processor 530 stores the third reference data 553 in the storage 520, and deletes the first operating system 541 and the first reference data 542. The processor 530 stores the third reference data 553 in a separate partition, separated from the partition in which the second operating system 551 is stored, within the storage 520. The second reference data 552 may be deleted from the storage 520, or the second reference data 552 may not be deleted but be maintained when it is involved in the second operating system 551.

Figure 8:
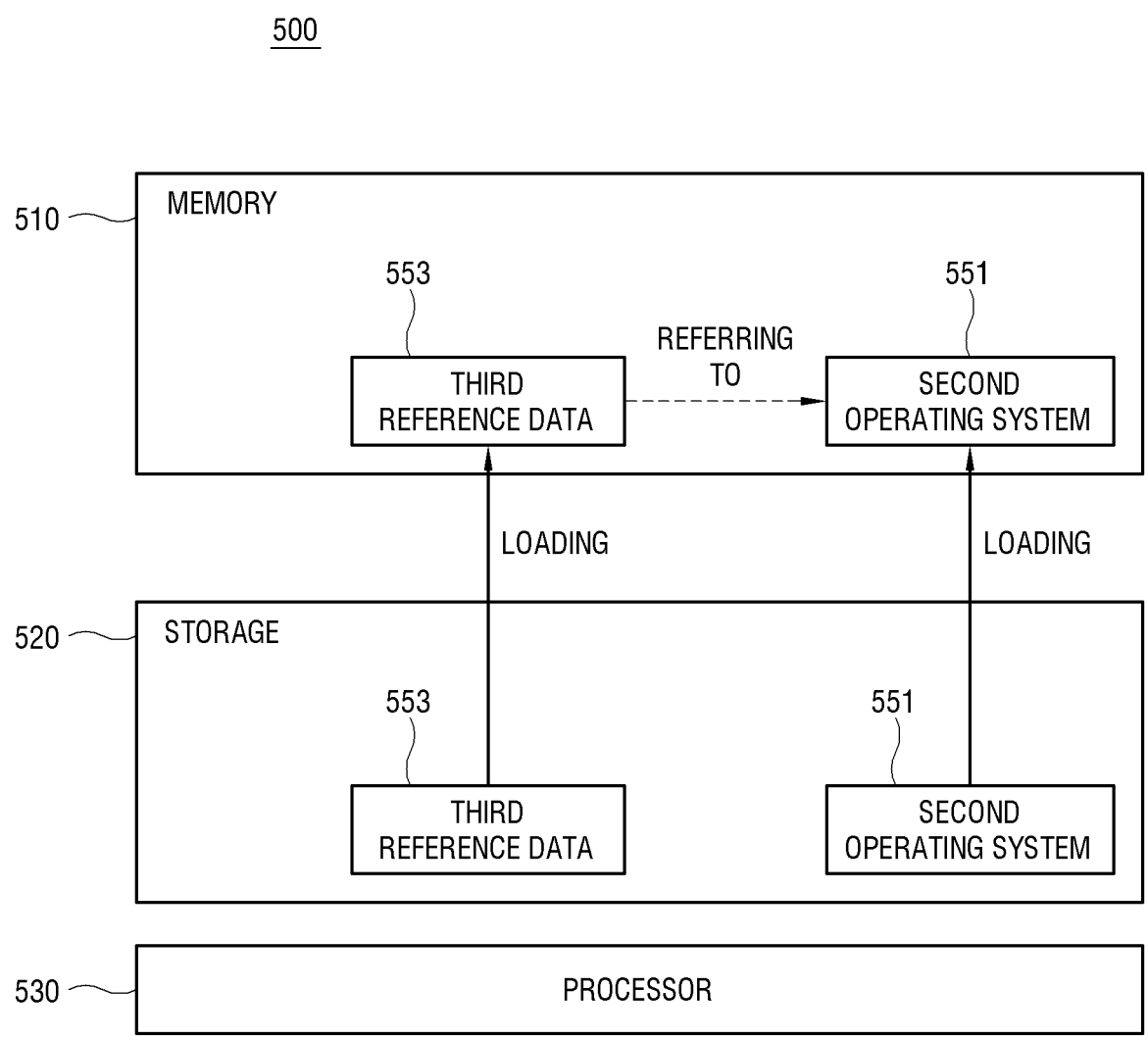
FIG. 8 is a block diagram illustrating an electronic apparatus being rebooted after storing third reference data in a storage according to an embodiment.

The processor 530 performs rebooting, and then operates as shown in FIG. 8 below.

On the other hand, when the check result shows that the operation compatibility is not normal, the processor 530 maintains the original settings for booting based on the first operating system 541, and continuously stores the first reference data 542 to be referred to by the first operating system 541. The second operating system 551 and the second reference data 552 may be deleted at the next rebooting. Alternatively, the processor 530 may display a UI to request a user's instruction on whether to delete the second operating system 551 and the second reference data 552 after the next rebooting, and selectively delete the second operating system 551 and the second reference data 552 in response to the instruction issued through the UI.

FIG. 8 is a block diagram illustrating an example electronic apparatus being rebooted after storing third reference data in a storage according to an embodiment.

As shown in FIG. 8, when the third reference data 553 giving a guarantee of the operation compatibility with the second operating system 551 is stored in the storage 520 during the previous stage of upgrading the operating system, the processor 530 may change the settings to use the second operating system 551 at the next booting, and then perform rebooting.

Based on the rebooting, the processor 530 loads the second operating system 551 from the storage 520 to the memory 510, and executes the second operating system 551. The storage 520 is configured to store the second operating system 551 and the third reference data 553, and the second operating system 551 calls and refers to the third reference data 553 as necessary, thereby guaranteeing continuity of use even after upgrading the operating system.

As described above, the method of checking the operation compatibility between the second operating system and the first reference data when the operating system is upgraded is as follows.

Figure 9:
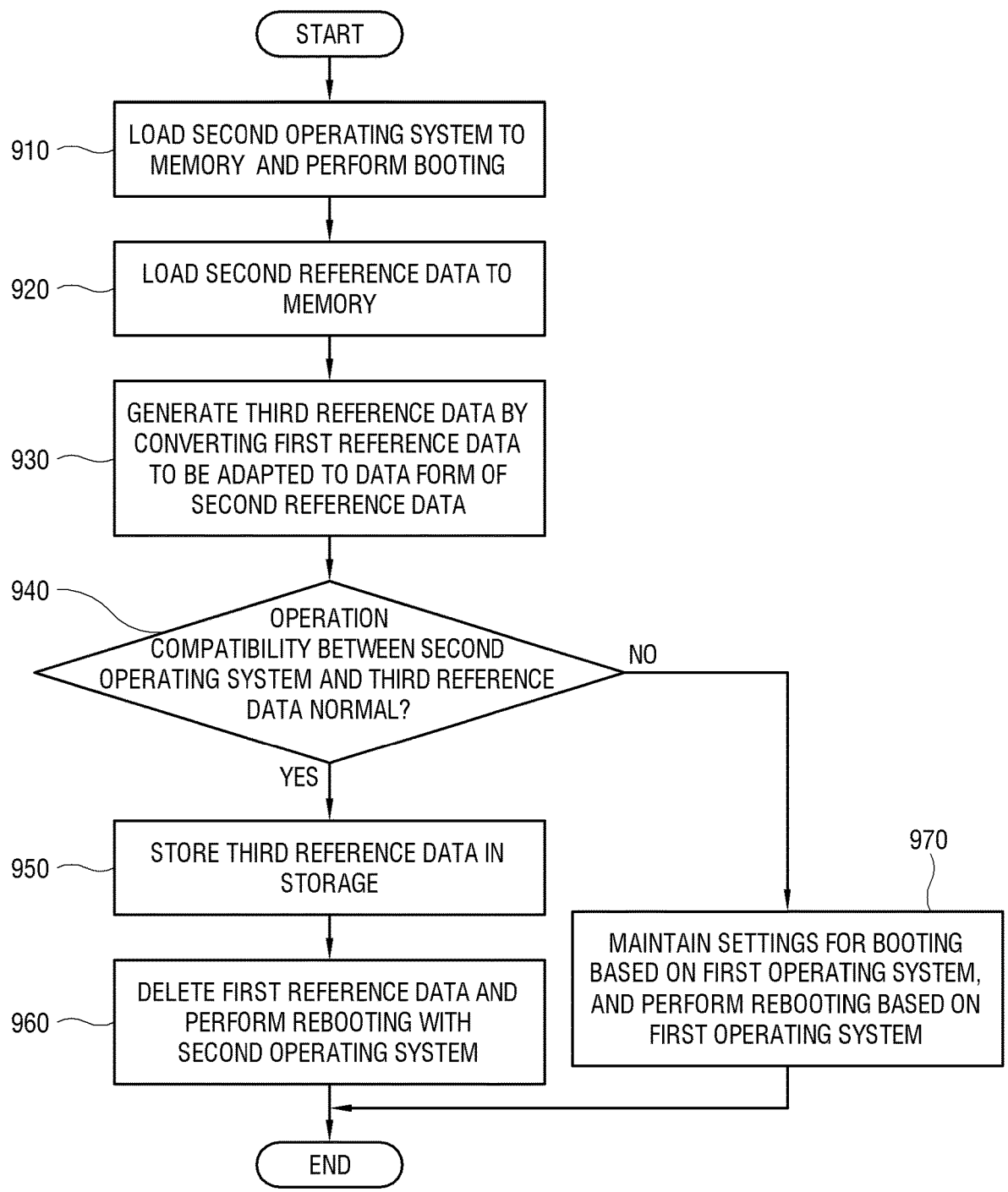
FIG. 9 is a flowchart illustrating example processes of the electronic apparatus to check operation compatibility between a second operating system for upgrading and previously used first reference data according to an embodiment.

FIG. 9 is a flowchart illustrating example processes of the electronic apparatus to check operation compatibility between a second operating system for upgrading and previously used first reference data according to an embodiment.

As shown in FIG. 9, the following operations may be performed by the processor of the electronic apparatus. In an initial state, the electronic apparatus stores the first operating system and the first reference data to be referred to by the first operating system in the storage, and newly obtains the second operating system for the upgrading and the second reference data to be referred to by the second operating system.

At operation 910 the electronic apparatus loads the obtained second operating system to the memory, and is then booted.

At operation 920 the electronic apparatus loads the second reference data to the memory.

At operation 930 the electronic apparatus generates the third reference data by converting the first reference data to be adapted to the data form of the second reference data loaded to the memory.

At operation 940 the electronic apparatus identifies whether the operation compatibility between the second operating system and the third reference data is normal.

When it is identified that the operation compatibility between the second operating system and the third reference data is normal ("Yes" at operation 940), at operation 950 the electronic apparatus stores the third reference data in the storage.

At operation 960 the electronic apparatus deletes the first reference data, and is rebooted with the second operating system. After the rebooting, the second operating system operates by referring to the third reference data. The first operating system and the second reference data may be deleted or maintained based on the settings.

On the other hand, when it is identified that the operation compatibility between the second operating system and the third reference data is not normal ("No" at operation 940), at operation 970 the electronic apparatus maintains the settings for the booting based on the first operating system, and is rebooted with the first operating system. After the rebooting, the electronic apparatus operates based on the first operating system referring to the first reference data.

Thus, the electronic apparatus provides an environment that guarantees continuous use of the first reference data.

When a certain error occurs while the operating system is upgraded, the electronic apparatus does not upgrade the operating system, but controls the settings to be booted with the original first operating system.

Below, an example of the data migration will be described in greater detail.

Figure 10:
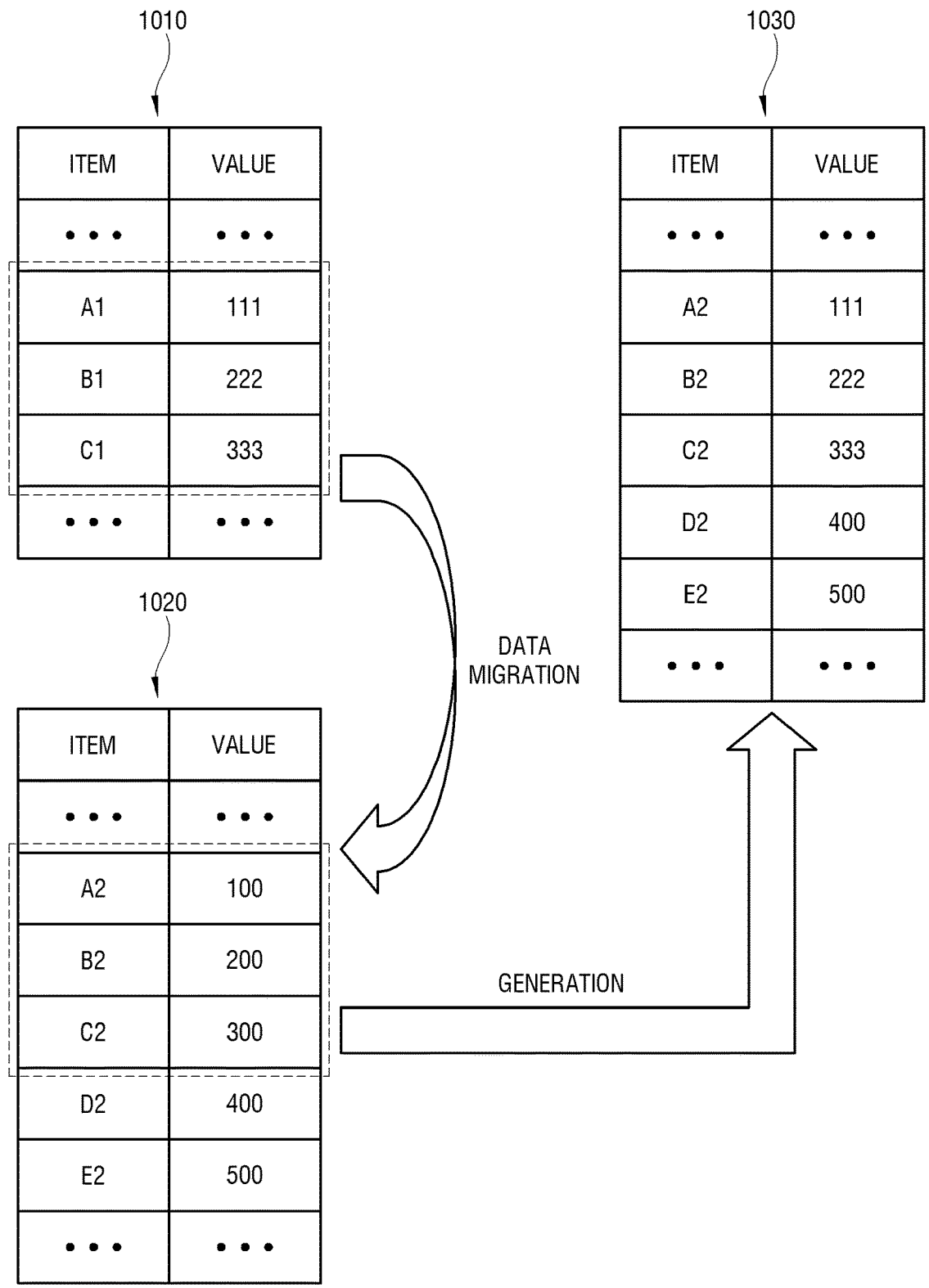
FIG. 10 is a diagram illustrating an example data migration method performed by an electronic apparatus according to an embodiment.

FIG. 10 is a diagram illustrating an example data migration method performed by an electronic apparatus according to an embodiment.

As shown in FIG. 10, the electronic apparatus generates third reference data 1030 based on first reference data 1010 and second reference data 1020. Specifically, the third reference data 1030 is generated by the data migration of the first reference data 1010 to the second reference data 1020 loaded to the memory.

When the first reference data 1010 and the second reference data 1020 comply with the same standards, the first reference data 1010 and the second reference data 1020 has version numbers based on the corresponding standards. In the standards, a range of compatible versions may be set. Thus, the electronic apparatus identifies whether the version of the first reference data 1010 and the version of the second reference data 1020 are compatible with each other. When it is identified that the two versions are compatible with each other, the electronic apparatus performs the data migration. When it is identified that the two versions are incompatible with each other, the electronic apparatus does not perform the data migration.

A guarantee of the operation compatibility between the second operating system and the second reference data 1020 may refer, for example, to the second operating system being able to recognize the data form of the second reference data 1020. On the other hand, no guarantee of the operation compatibility between the second operating system and the first reference data 1010 may refer, for example, to it being difficult for the second operating system to normally recognize the data form of the first reference data 1010.

Thus, the third reference data 1030 may be generated by a method of converting the first reference data 1010 to be adapted to the data form of the second reference data 1020 so as to be normally recognized by the second operating system. The data migration is merely one example of such method.

For example, each piece of the reference data 1010, 1020, and 1030 includes a plurality of items, and values corresponding to the items. For example, the first reference data 1010 includes data of "[f(A1)=111, f(B1)=222, f(C1)=333]". This shows that an item A1 has a value of 111, an item B1 has a value of 222, and an item C1 has a value of 333 in the first reference data 1010. In the same manner, the second reference data 1020 may be expressed by "[f(A2)=100, f(B2)=200, f(C2)=300, f(D2)=400, f(E2)=500]".

To perform the data migration of the first reference data 1010 to the second reference data 1020, the electronic apparatus identifies the item of the second reference data 1020 corresponding to the item of the first reference data 1010. The electronic apparatus may implement such an identification operation based on the standards of the reference data 1010, 1020 and 1030. When the first reference data 1010 is regarded as an old version and the second reference data 1020 is regarded as a new version, version-up changes in the data form are typically stored corresponding to standards.

For example, when it is identified that the items A2, B2 and C2 of the second reference data 1020 correspond the items A1, B1 and C1 of the first reference data 1010, the electronic apparatus performs the data migration based on such identification results. The electronic apparatus updates the items A2, B2 and C2 of the second reference data 1020 with the corresponding items A1, B1 and C1 of the first reference data 1010. In other words, the item A2 of '100' in the second reference data 1020 is substituted with '111', the item B2 of '200' is substituted with '222', and the item C2 of '300' is substituted with '333'.

By the data migration, the values of the items among the plurality of items in the second reference data 1020, which respectively correspond to the items of the first reference data 1010, are replaced with the values of the first reference data 1010, and thus the third reference data 1030 generated as a result of the data migration includes the first reference data 1010 converted to be adapted to the data form of the second reference data 1020.

For example, the third reference data 1030 is expressed by [f(A2)=111, f(B2)=222, f(C2)=333, f(D2)=400, f(E2)=500]. A2, B2 and C2 among the items of the third reference data 1030 are replaced by the values of the first reference data 1010. Meanwhile, there may be no matching items between the first reference data 1010 and the second reference data 1020, like D2 and E2 among the items of the third reference data 1030. In this case, the values of the second reference data 1020 are maintained as they are.

The foregoing example is simply one method of the data migration, and various methods may be used for the data migration according to designs.

Meanwhile, the foregoing embodiment illustrates that the old first operating system is replaced with the new second operating system when the operating system is upgraded. However, the upgrading for the operating system may include not only replacing the whole data codes of the operating system but also changing some data codes of the operating system. Below, an embodiment in such a case will be described in greater detail.

Figure 11:
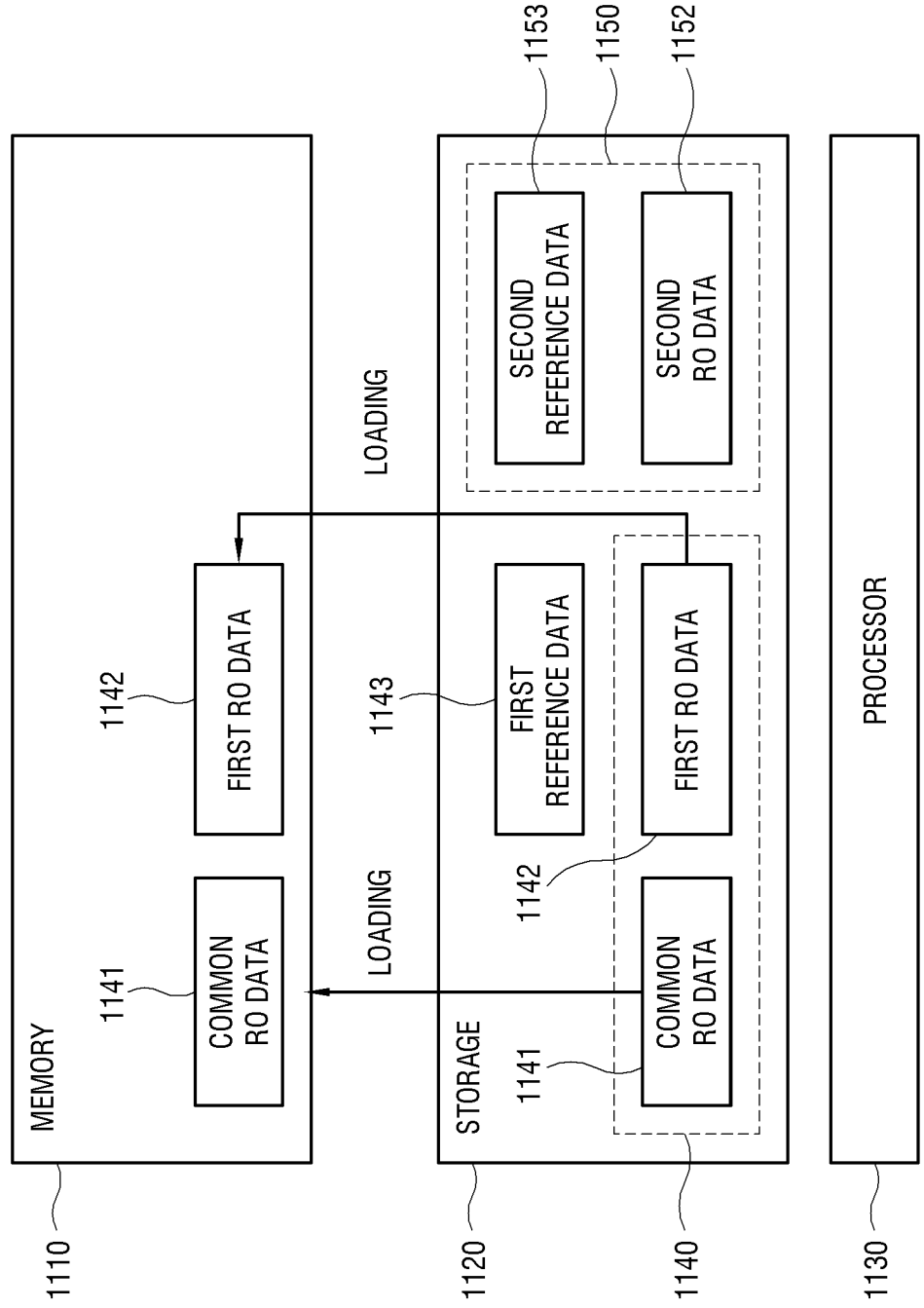
FIG. 11 is a block diagram illustrating an electronic apparatus receiving data for upgrading some data codes of an operating system according to an embodiment.

FIG. 11 is a block diagram illustrating an example electronic apparatus receiving data for upgrading some data codes of an operating system.

As shown in FIG. 11, an electronic apparatus 1100 includes a memory 1110, a storage 1120, and a processor (e.g., including processing circuitry) 1130. In an initial state, the electronic apparatus 1100 loads an operating system 1140 from the storage 1120 to the memory 1110 and executes the operating system 1140. While the electronic apparatus 1100 is driven by the operating system 1140, the processor 1130 receives package data 1150 for upgrading the operating system 1140 and stores the package data 1150 in the storage 1120.

The package data 1150 includes second RO data 1152 and second reference data 1153. The first reference data 1143 and the second reference data 1153 are substantially similar to those of the foregoing embodiment, and thus repetitive descriptions thereof may be avoided. The second RO data 1152 is data for replacing not the whole data code of the operating system 1140, but some data codes of the operating system 1140. Among the whole data codes of the operating system 1140, a data code unchanged by the upgrading may be referred to as common RO data 1141, and a data code changed or replaced by the second RO data 1152 may be referred to as first RO data 1142. In other words, the common RO data 1141 and first RO data 1142 of the operating system 1140 are just distinguished by whether they are changed or not when the operating system 1140 is upgraded.

To upgrade the operating system 1140, the processor 1130 stores flag information for directing the upgrading and performs rebooting. Below, in connection with the upgrading of the operating system 1140 performed in an example embodiment, descriptions of substantially the same configurations and operations may not be repeated.

Figure 12:
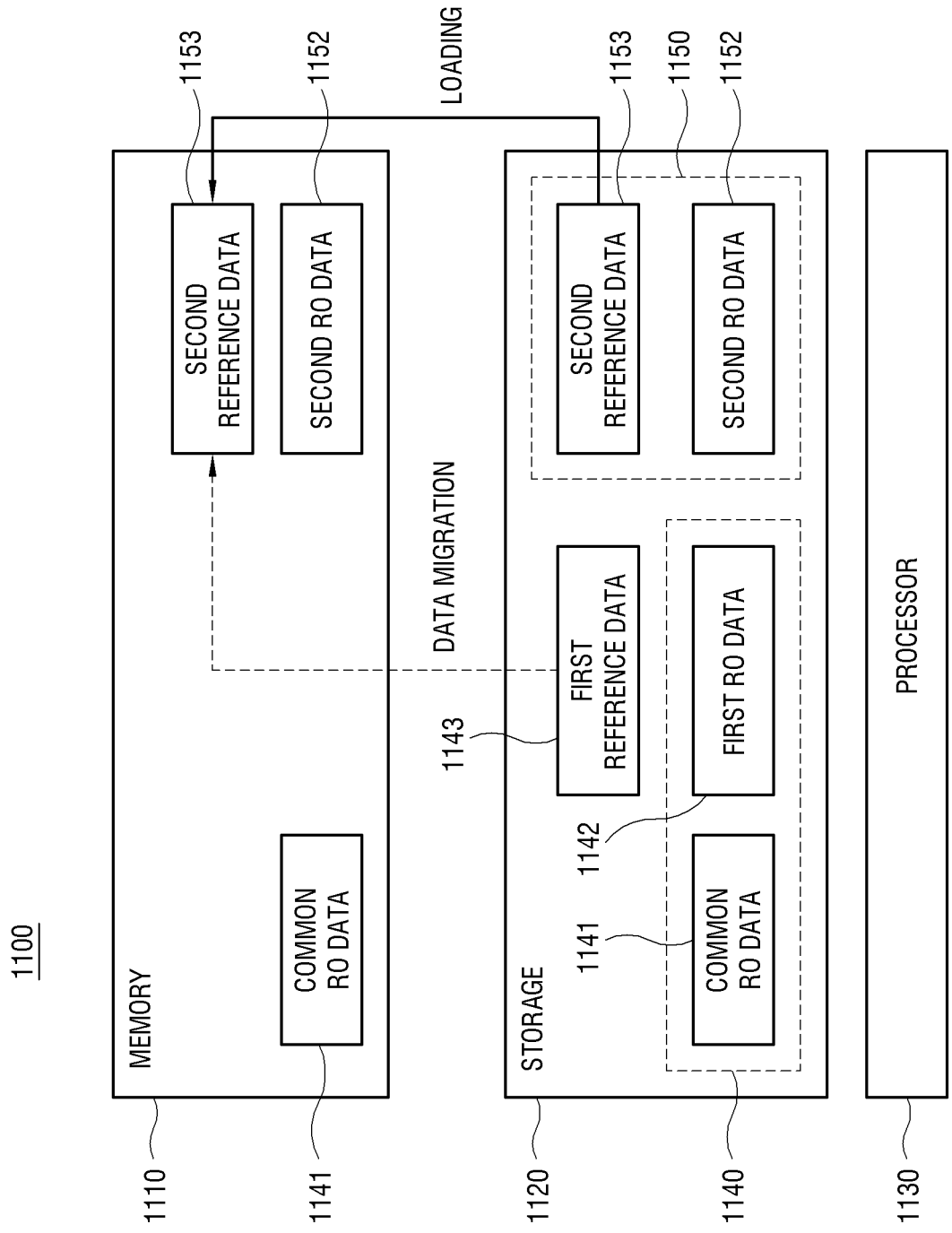
FIG. 12 is a block diagram illustrating an electronic apparatus performing data migration for first reference data according to an embodiment.

FIG. 12 is a block diagram illustrating an example electronic apparatus performing data migration for first reference data according to an embodiment.

As shown in FIG. 12, the processor 1130 loads the common RO data 1141 and the second RO data 1152 from the storage 1120 to the memory 1110 based on the foregoing flag information at the rebooting. The upgraded operating system is achieved by combination of the common RO data 1141 and the second RO data 1152.

The processor 1130 loads the second reference data 1153, which is prepared to give a guarantee of operation compatibility with the second RO data 1152, from the storage 1120 to the memory 1110. The processor 1130 performs data migration that moves the first reference data 1143 stored in the storage 1120 to correspond to the second reference data 1153 loaded to the memory 1110.

As a result of the data migration, the first reference data 1143 is converted to correspond to the second reference data 1153 loaded to the memory 1110, and thus the third reference data is generated. The data migration is the same as described above, and thus repetitive descriptions thereof will be avoided.

Figure 13:
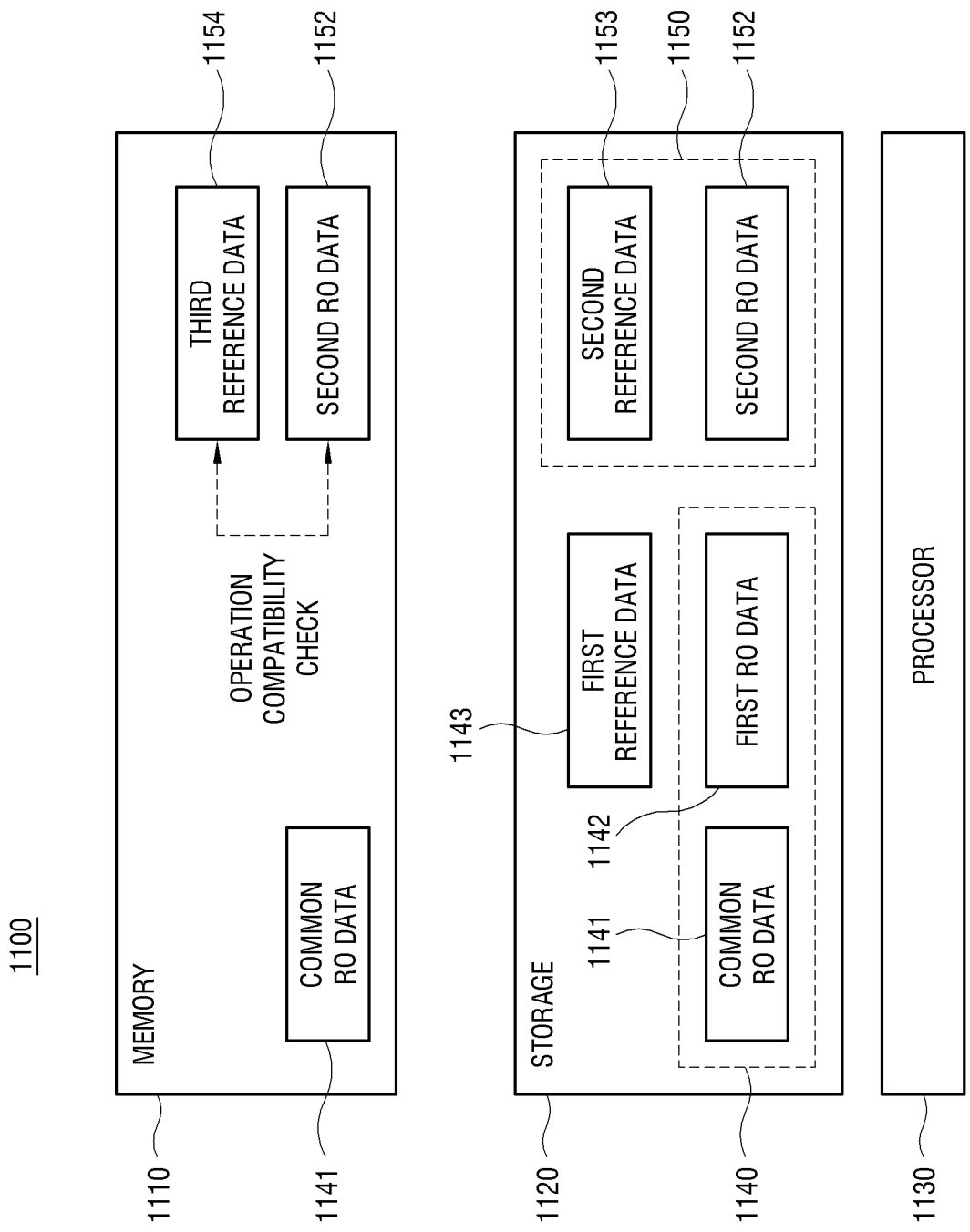
FIG. 13 is a block diagram illustrating an electronic apparatus checking operation compatibility between second RO data and third reference data according to an embodiment.

FIG. 13 is a block diagram illustrating an example electronic apparatus checking operation compatibility between second RO data and third reference data.

As shown in FIG. 13, the processor 1130 checks whether operation compatibility between the upgraded second RO data 1152 and the third reference data 1154 in the operating system loaded to the memory 1110 is normal, e.g., whether the upgraded operating system is able to normally use the third reference data 1154.

When the check result shows that the operation compatibility is normal, the processor 1130 changes the current combination of the common RO data 1141 and first RO data 1142 to the combination of the common RO data 1141 and the second RO data 1152 in the booting settings for the operating system. Further, the processor 1130 stores the third reference data 1154 loaded to the memory 1110 in the storage 1120. Thus, the third reference data 1154 that gives a guarantee of the operation compatibility with the second RO data 1152 is stored in the storage 1120.

Further, the processor 1130 deletes the first RO data 1142 and the first reference data 1143 from the storage 1120. The second reference data 1153 may be set to be deleted or not to be deleted. The processor 1130 performs rebooting, and then operates as shown in FIG. 14.

Figure 14:
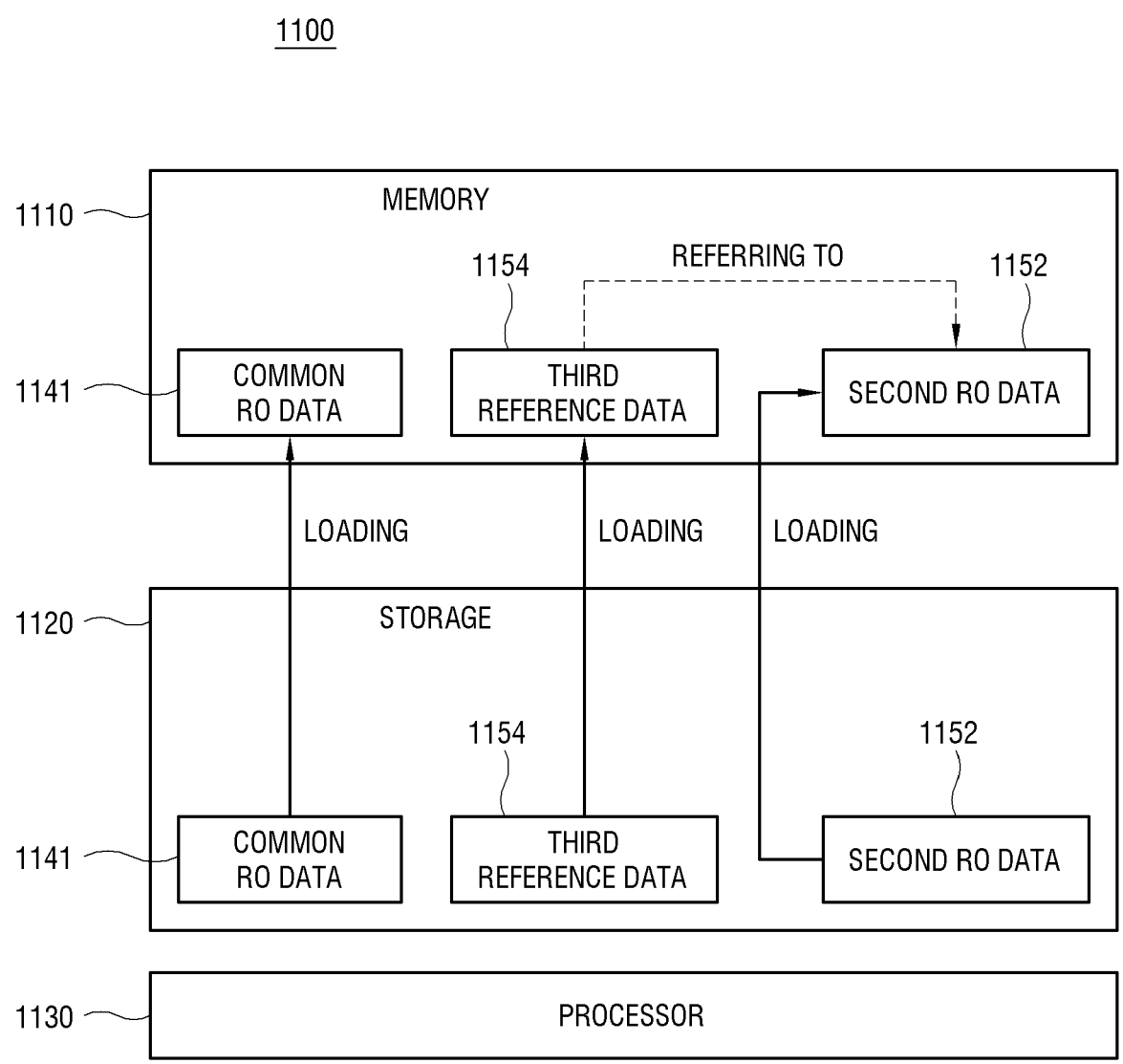
FIG. 14 is a block diagram illustrating an electronic apparatus being rebooted after storing third reference data in a storage according to an embodiment.

FIG. 14 is a block diagram illustrating an example electronic apparatus being rebooted after storing third reference data in a storage according to an embodiment.

As shown in FIG. 14, the processor 1130 stores the third reference data 1154, which gives a guarantee of the operation compatibility with the second RO data 1152, in the storage 1120 in the previous stage, e.g., the process of upgrading the operating system, and changes the settings so that the booting is carried out based on the common RO data 1141 and the second RO data 1152, thereby performing the rebooting.

Based on the rebooting, the processor 1130 loads the common RO data 1141 and the second RO data 1152 from the storage 1120 to the memory 1110, and executes the operating system. The storage 1120 is configured to store the common RO data 1141, the second RO data 1152 and the third reference data 1154. The operating system calls and refers to the third reference data 1154 as necessary, thereby guaranteeing continuity of use even after upgrading the operating system.

As described above in the foregoing example embodiments, the electronic apparatus stores the third reference data, which is generated in the memory after the data migration, in the storage, and performs the rebooting. While the third reference data is stored in the storage, the electronic apparatus blocks accesses of other processes to the third reference data. For example, various applications may run on the operating system, and processes may be performed by the applications. When the third reference data on the memory is not isolated from other processes, the third reference data on the memory may be modified by other processes. When such modified third reference data is stored in the storage, the third reference data called by the operating system at the next booting may be incompatible.

To avoid this, the electronic apparatus isolates the third reference data from other processes while the third reference data generated on the memory is stored in the storage.

To upgrade the operating system as described above in the foregoing embodiments, the processor may obtain boot script for directing detailed operations performed at the rebooting. The processor reads the boot script at the rebooting, and loads data to the memory and performs necessary operations based on the boot script. The electronic apparatus may obtain the boot script through various routes, for example, a boot script provided along with the package data for upgrading the operating system, a boot script from a separate apparatus separated from the package data, etc.

The foregoing embodiment shows that the processor processes the second operating system and the second reference data to be individually loaded to different areas of the memory. However, when the second operating system and the second reference data are loaded to the memory, an overlay file system (OverlayFS) or the like technique may be used to save an occupied space of the memory. Below, such an embodiment will be described in greater detail.

Figure 15:
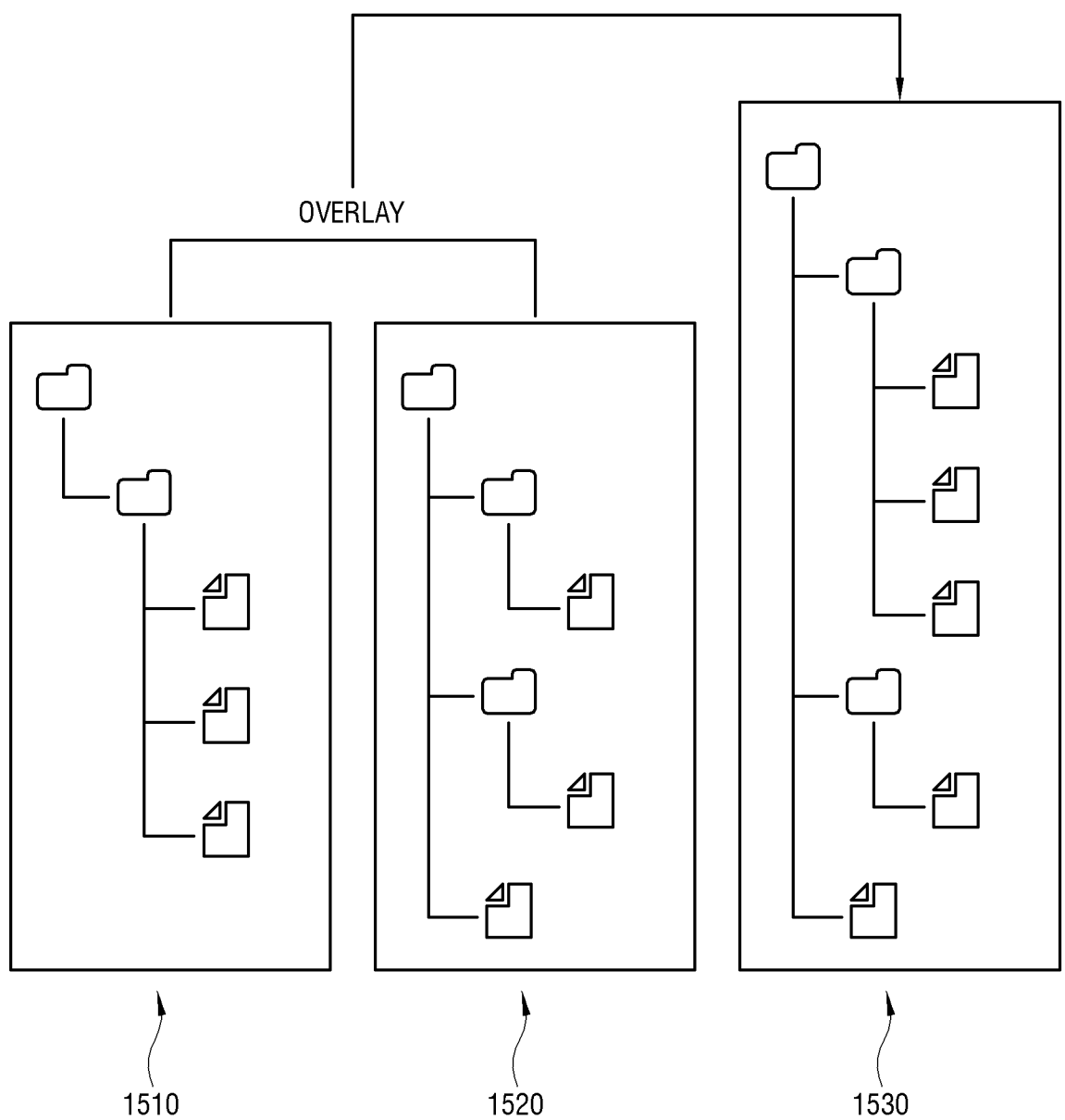
FIG. 15 is a diagram illustrating an example overlay file system applicable to an electronic apparatus according to an embodiment.

FIG. 15 is a diagram illustrating an example principle of an OverlayFS applicable to an electronic apparatus according to an embodiment.

As shown in FIG. 15, first data 1510 and second data 1520 are different in content and a file directory structure. As an example of the OverlayFS according to an example embodiment, there is an OverlayFS provided since the Linux kernel 3.18. The OverlayFS provides two kinds of layers, in which a lower layer and an upper layer are structurally called lowerdir and upperdir, respectively. When the first data 1510 is achieved by the lowerdir and the second data 1520 is achieved by the upperdir, a merged view 1530 is recognized as if the first data 1510 of the lowerdir and the second data 1520 of the upperdir are overlaid.

To support such OverlayFS, the first data 1510 and the second data 1520 do not include content or structures exclusive each other, and need to normally operate when they are executed together.

The processor may overlay and mount the first data 1510 and the second data 1520 to the same storage area or address of the memory based on the OveralyFS. As a result of the mounting, the merged view 1530 shows all the content and file structures of both the first data 1510 and the second data 1520. Here, the first data 1510 of the lowerdir is read-only data, but writing is allowed in the second data 1520 of the upperdir.

Based on such a principle, the electronic apparatus is able to perform the data migration. Such an embodiment will be described in greater detail below.

Figure 16:
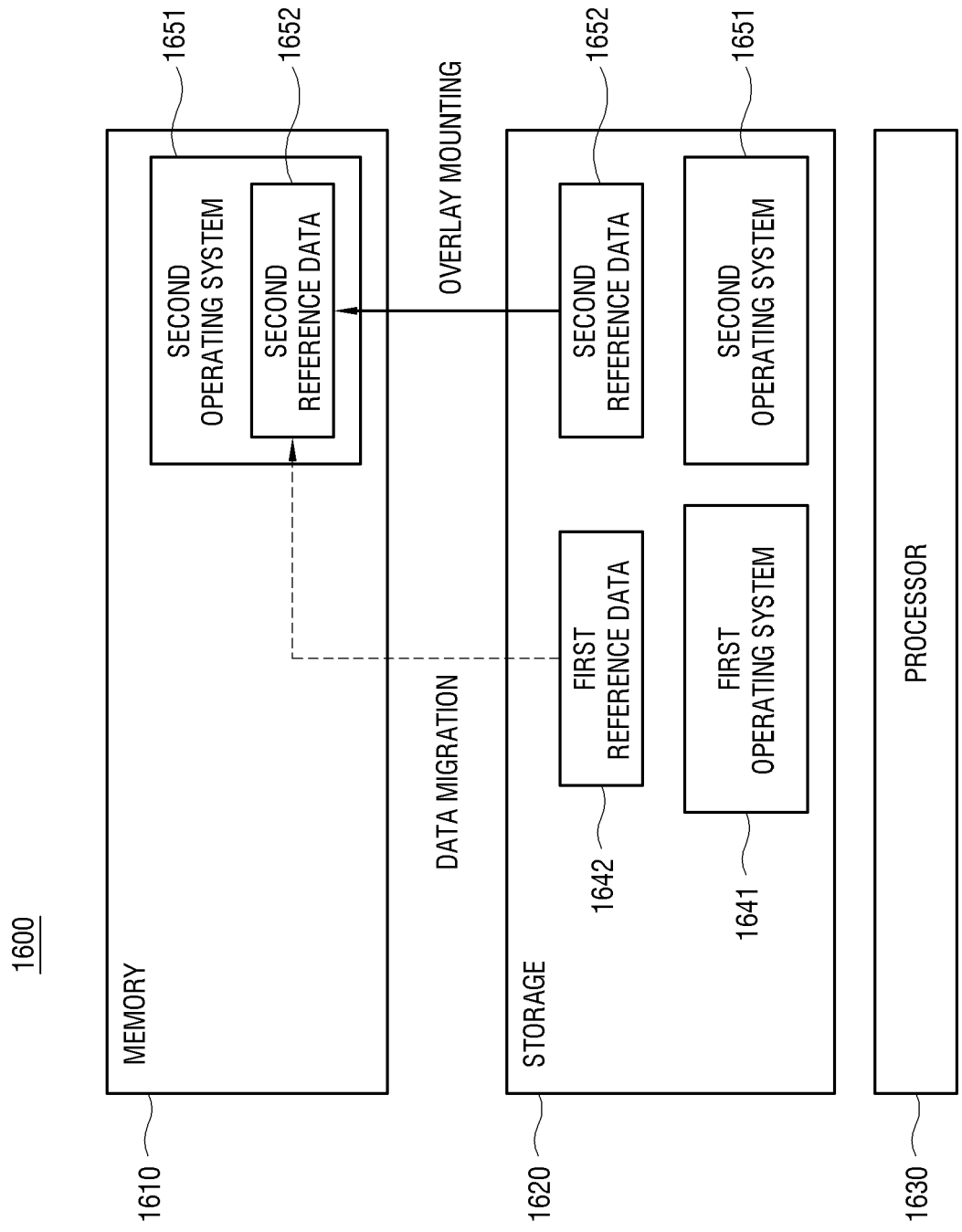
FIG. 16 is a block diagram illustrating an electronic apparatus performing data migration in a state where a second operating system and second reference data are overlaid and mounted according to an embodiment.

FIG. 16 is a block diagram illustrating an example electronic apparatus performing data migration in a state that a second operating system and second reference data are overlaid and mounted according to an embodiment.

As shown in FIG. 16, an electronic apparatus 1600 includes a memory 1610, a storage 1620, and a processor (e.g., including processing circuitry) 1630. The storage 1620 is configured to store a first operating system 1641, first reference data 1642, a second operating system 1651, and second reference data 1652. The process of upgrading the operating system of the electronic apparatus 1600 is substantially the same as described above in the foregoing embodiments, and therefore repetitive descriptions thereof will be avoided.

To perform the data migration for the first reference data 1642, the processor 1630 mounts the second reference data 1652 from the storage 1620 to the memory 1610. In this case, the processor 1630 may mount the second reference data 1652 to an address of the memory 1610, which is different from the address for the second operating system 1651, similarly to the foregoing embodiment.

Alternatively, the processor 1630 may mount the second reference data 1652 to be overlaid with the second operating system 1651 already mounted to the memory 1610, based on the foregoing principle of the OverlayFS. In other words, the OverlayFS-based mounting is achieved by the lowerdir of the second operating system 1651 and the upperdir of the second reference data 1652. Thus, an example embodiment more saves the occupied capacity of the memory 1610 than the foregoing embodiment as much as the size of the second reference data 1652.

The processor 1630 performs the data migration of the first reference data 1642 with regard to the second reference data 1652 overlaid and mounted to the second operating system 1651. When the first reference data 1642 is normally converted into the third reference data, which gives a guarantee of operation compatibility with the second operating system 1651, by the data migration, the processor 1630 may check the operation compatibility between the third reference data and the second operating system 1651. Operations related to this are also substantially the same as those of the foregoing embodiments, and therefore repetitive descriptions thereof will be avoided.

Meanwhile, the principle of the OverlayFS may be applicable to various embodiments. For example, it may be assumed that the operating system of the electronic apparatus includes the common RO data and the first RO data and is upgraded by newly replacing the first RO data of the operating system with the second RO data. In this case, the electronic apparatus first mounts the common RO data to the memory, and then mounts the second RO data to be overlaid with the common RO data mounted to the memory.

Further, when the OverlayFS is based on standards allowing a plurality of lowerdirs, the electronic apparatus may mount the second reference data as the upperdir onto the overlaid common and second RO data, and perform the data migration of the first reference data.

The operations of the apparatus described in the foregoing embodiments may be performed by artificial intelligence provided in the corresponding apparatus. The artificial intelligence may be applied to various general systems by utilizing a machine learning algorithm. An artificial intelligence system refers to a computer system with intelligence of a human or being second to a human. In such a system, a machine, an apparatus or a system autonomously performs leaning and identifying and is improved in accuracy of recognition and identification based on accumulated experiences. The artificial intelligence is based on elementary technology by utilizing machine learning (deep-learning) technology and algorithms based on an algorithm of autonomously classifying and learning features of input data, and copying perception, identification and the like functions of a human brain.

The elementary technology may for example include at least one of language comprehension technology for recognizing a language and a text of a human, visual understanding technology for recognizing a thing like a human sense of vision, inference and prediction technology for identifying information and logically making inference and prediction, knowledge representation technology for processing experience information of a human into knowledge data, and motion control technology for controlling a vehicle's automatic driving or a robot's motion.

Here, linguistic comprehension may refer, for example, to technology of recognizing, applying and processing a human's language or text, and includes natural language processing, machine translation, conversation system, question and answer, voice recognition and synthesis, etc.

Inference and prediction may refer, for example, to technology of identifying information and logically making prediction, and includes knowledge- and probability-based inference, optimized prediction, preference-based plan, recommendation, etc.

Knowledge representation may refer, for example, to technology of automating a human's experience information into knowledge data, and includes knowledge building such as data creation and classification, knowledge management such as data utilization, etc.

The methods according to the foregoing embodiments may be achieved in the form of a program instruction that can be implemented in various computers, and recorded in a computer readable medium. Such a computer readable medium may include a program instruction, a data file, a data structure or the like, or combination thereof. For example, the computer readable medium may be stored in a nonvolatile storage such as universal serial bus (USB) memory, regardless of whether it is deletable or rewritable, for example, a RAM, a ROM, a flash memory, a memory chip, an integrated circuit (IC) or the like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the embodiments. The program instruction recorded in this storage medium may be specially designed and configured according to the embodiments, or may be publicly known and available to those skilled in the art of computer software. Further, the computer program instruction may be implemented by a computer program product.

While the disclosure has been illustrated and described with reference to various example embodiments thereof, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic apparatus comprising:
   a memory;
   a storage configured to store a first operating system; and
   a processor configured to:
      perform booting by loading the first operating system stored in the storage to the memory, and store data in the storage for setting of functions of the electronic apparatus under the first operating system,
      obtain a second operating system and store the second operating system in the storage, when the electronic apparatus operates based on the first operating system,
      perform booting by loading the second operating system stored in the storage to the memory,
      identify operation compatibility between the second operating system and the data by at least determining whether the data is processible by the second operating system, when the electronic apparatus operates based on the second operating system,
      delete the first operating system in the storage and perform rebooting by loading the second operating system to the memory, based on the identification of normal operation compatibility, and
      perform booting by loading the first operating system to the memory based on the identification of abnormal operation compatibility.

2. The electronic apparatus according to claim 1, wherein the processor is configured to: convert the data stored in the storage to a data form corresponding to the second operating system, and load the converted data to the memory.

3. The electronic apparatus according to claim 2, wherein the processor is configured to: store the converted data in the storage to replace the data stored in the storage, based on identification of normal operation compatibility.

4. The electronic apparatus according to claim 3, wherein the processor is configured to: isolate the converted data from a predetermined process running in the electronic apparatus based on the converted data being generated in the memory and stored in the storage.

5. The electronic apparatus according to claim 2, wherein the processor is configured to: load data corresponding to the second operating system to the memory, and adjust values of items of the data corresponding to the second operating system with values of the data stored in the storage.

6. The electronic apparatus according to claim 1, wherein the processor is configured to load the data to the memory to overlay the data in a storage area, to which the second operating system is loaded, in the memory.

7. The electronic apparatus according to claim 1, wherein the processor is configured to: store the first operating system and the second operating system in respective partitions of the storage separated from each other.

8. The electronic apparatus according to claim 7, wherein the processor is configured to: store the data in a partition separated from the partitions, in which the first operating system and the second operating system are stored, in the storage.

9. The electronic apparatus according to claim 1, wherein the processor is configured to: perform booting by loading the second operating system to the memory to use default data provided to the second operating system based on identification of abnormal operation compatibility.

10. A method of controlling an electronic apparatus, the method comprising:
performing booting by loading a first operating system stored in a storage to a memory, and storing data in the storage in the storage for setting of functions of the electronic apparatus under the first operating system;
obtaining a second operating system and storing the second operating system in the storage, when the electronic apparatus operates based on the first operating system,
performing booting by loading the second operating system stored in the storage to the memory;
identifying operation compatibility between the second operating system and the data by determining whether the data is processible by the second operating system, when the electronic apparatus operates based on the second operating system;
deleting the first operating system in the storage and performing rebooting by loading the second operating system to the memory based on identification of normal operation compatibility; and
performing booting by loading the first operating system to the memory, based on identification of abnormal operation compatibility.

11. The method according to claim 10, wherein the data stored in the storage is converted to a data form corresponding to the second operating system, and loaded to the memory.

12. The method according to claim 11, wherein the converted data is stored in the storage to replace the data stored in the storage, based on identification of normal operation compatibility.

13. The method according to claim 12, wherein the converted data is isolated from a predetermined process running in the electronic apparatus, based on the converted data being generated in the memory and stored in the storage.

14. The method according to claim 11, wherein data corresponding to the second operating system is loaded to the memory, and values of items of the data corresponding to the second operating system are adjusted with values of the data stored in the storage.

15. The method according to claim 10, wherein the data is loaded to the memory to overlay the data in a storage area, to which the second operating system is loaded, in the memory.

16. The method according to claim 10, wherein the first operating system and the second operating system are stored in respective partitions of the storage separated from each other.

17. The method according to claim 16, wherein the data is stored in a partition separated from the partitions, in which the first operating system and the second operating system are stored, in the storage.

18. The method according to claim 10, wherein booting is performed by loading the second operating system to the memory to use default data provided to the second operating system, based on identification of abnormal operation compatibility.

* * * * *